(12) United States Patent
Gaspard et al.

(10) Patent No.: US 10,313,848 B2
(45) Date of Patent: Jun. 4, 2019

(54) SYSTEM AND METHOD FOR DYNAMICALLY EXCHANGING, STORING, UPDATING, AND INTERACTING WITH DIGITAL IDENTITIES ON PORTABLE COMPUTING DEVICES USING INTERFACES, GESTURES AND MONITORED ACTIVITY

(71) Applicant: THE CIRCLE PROJECT, LLC, Pasadena, CA (US)

(72) Inventors: Sara Gaspard, Los Angeles, CA (US); Scott Gaspard, Los Angeles, CA (US); Simon Nicholls, Palos Verdes Estates, CA (US)

(73) Assignee: The Circle Project, LLC, Pasadena, CA (US)

( * ) Notice: Subject to any disclaimer, the term of this patent is extended or adjusted under 35 U.S.C. 154(b) by 185 days.

(21) Appl. No.: 15/602,091

(22) Filed: May 22, 2017

(65) Prior Publication Data
US 2017/0337360 A1 Nov. 23, 2017

Related U.S. Application Data

(60) Provisional application No. 62/339,751, filed on May 20, 2016.

(51) Int. Cl.
*G06F 16/00* (2019.01)
*G06F 3/0484* (2013.01)
(Continued)

(52) U.S. Cl.
CPC ........... *H04W 4/21* (2018.02); *G06F 3/0484* (2013.01); *G06F 3/0488* (2013.01); *G06F 16/00* (2019.01); *G06F 2203/011* (2013.01)

(58) Field of Classification Search
CPC ...... H04W 4/21; G06F 3/0484; G06F 3/0488; G06F 17/30; G06F 2203/011
See application file for complete search history.

(56) References Cited

U.S. PATENT DOCUMENTS 8,914,024 B2* 12/2014 Alharayeri .............. H04W 4/02
370/310.2
2016/0255139 A1* 9/2016 Rathod .................... H04L 67/22
709/203

FOREIGN PATENT DOCUMENTS

CN 102026115 A 4/2011
CN 103220408 A 7/2013
CN 103546631 A 1/2014

OTHER PUBLICATIONS

Martin Bryant, 5 Mobile Apps That Could Kill Business Cards—TNW News, Jan. 23, 2011, 5 pages.
(Continued)

*Primary Examiner* — Jeffrey A Gaffin
*Assistant Examiner* — Ayesha R Huertas Torres
(74) *Attorney, Agent, or Firm* — Lewis Roca Rothgerber Christie LLP

(57) ABSTRACT

A system for storing and searching digital identities includes a mobile device including: a processor; a display coupled to the processor; a user interface device for sending a signal to the processor according to a user input; and a memory storing instructions that, when executed by the processor, cause the processor to: store a plurality of digital identities in the memory, herein each of the digital identities includes a name of a corresponding user, an address of the corresponding user, a contact email and/or phone number of the corresponding user, and additional characteristics pertaining to the user, displayed in a single screen of the mobile device, and wherein each of the digital identities is updated in real-time; sort the plurality of digital identities according to (Continued)

a search function upon receipt of a search command, the search command including a search term and an ordered combination of indexing values, each of the indexing values including one of a date, a location, and a category; filter the plurality of digital identities according to an output value of the search function and the search term; order the plurality of digital identities from highest output value to lowest output value according to the filtered plurality of digital identities; and display the ordered plurality of digital identities on the single screen of the mobile device, wherein the digital identities of third parties not associated with the first user are automatically installed on the mobile device based upon one or more of speed, location, distance, duration, network connection, and/or search history.

15 Claims, 16 Drawing Sheets

(51) Int. Cl.
*G06F 3/0488* (2013.01)
*H04W 4/21* (2018.01)

(56) References Cited

OTHER PUBLICATIONS

INTSIG Information Co., Ltd., CamCard Free—Last updated Jan. 18, 2016, 5 pages.
Webpage printout of CamCard website, 5 pages.

* cited by examiner

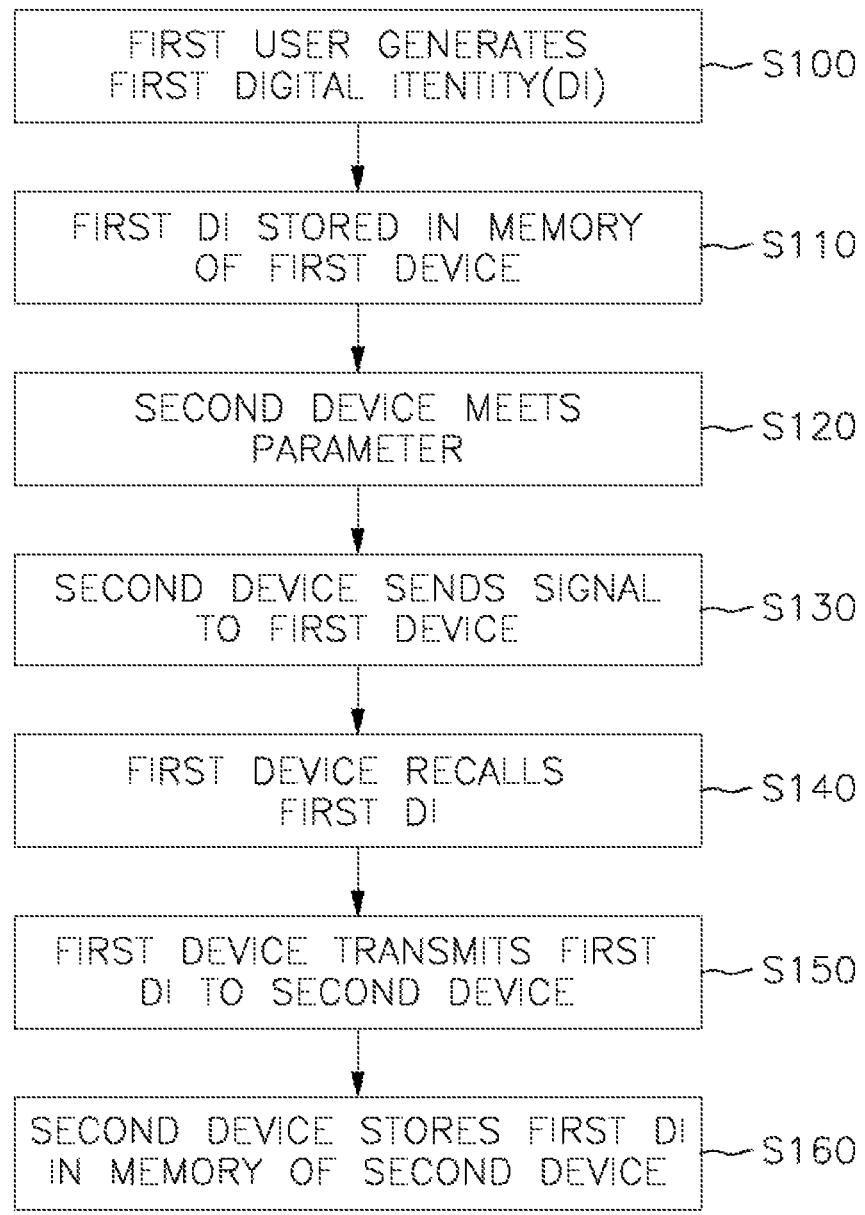

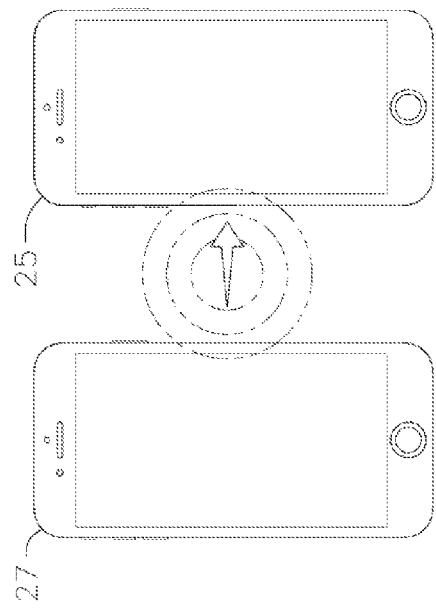
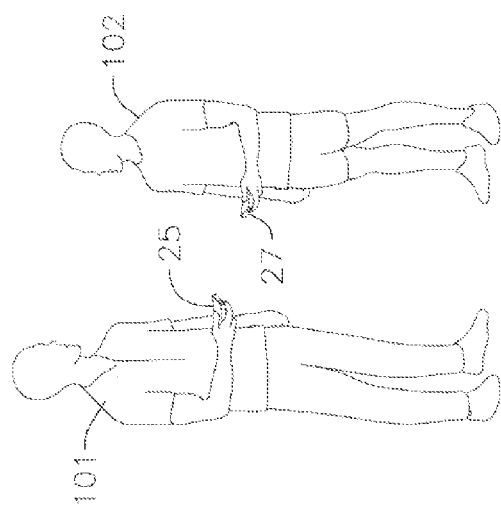
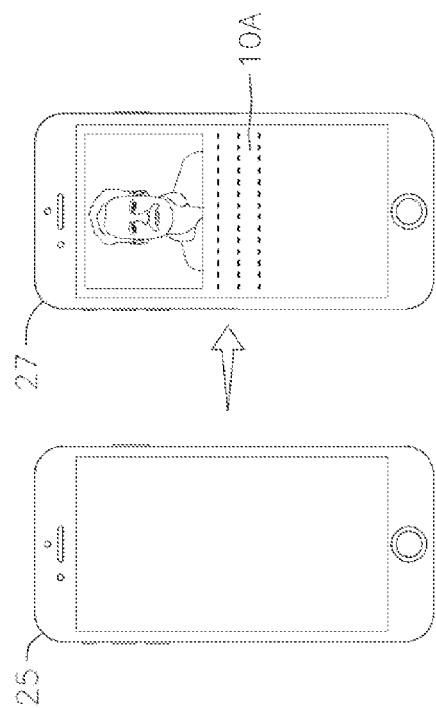

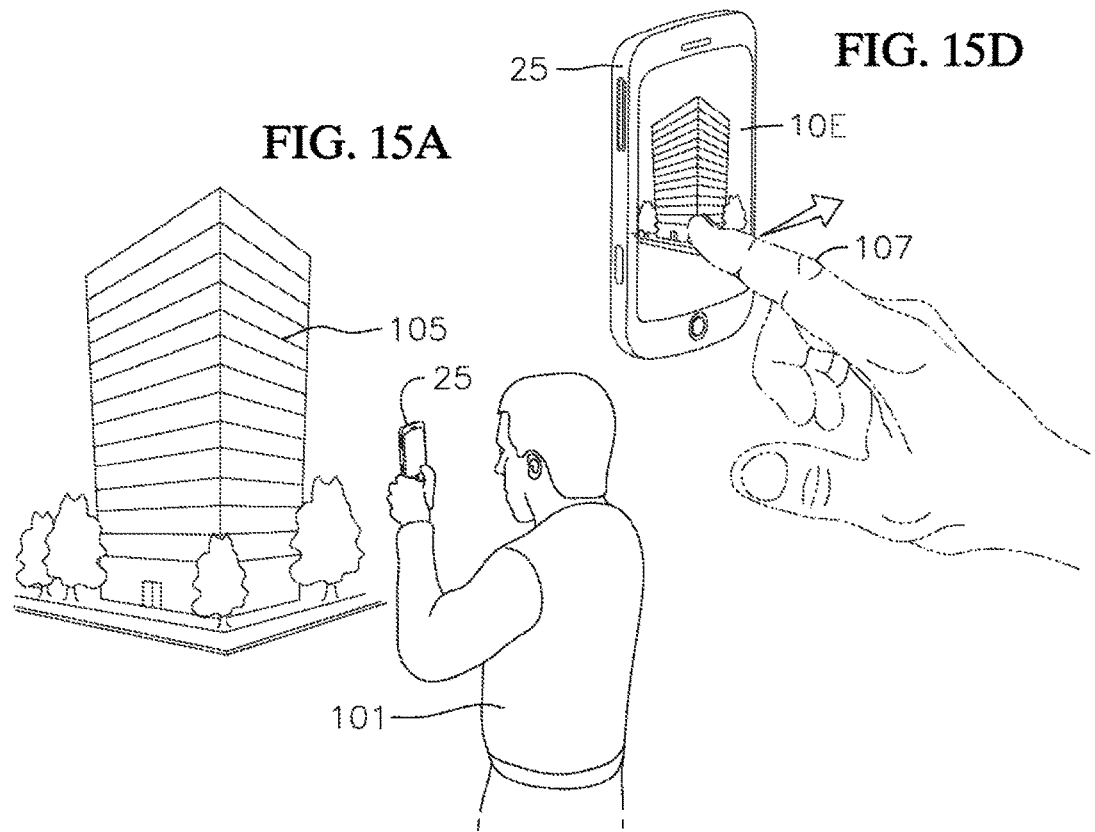
FIG. 15A
FIG. 15D
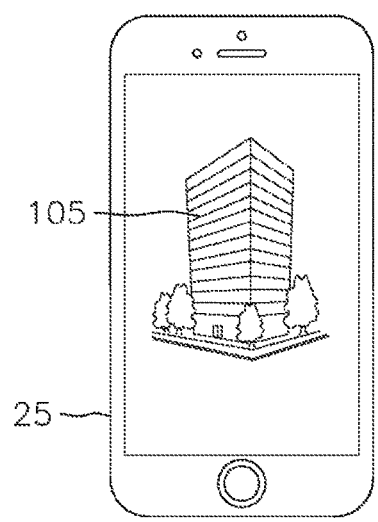
FIG. 15B
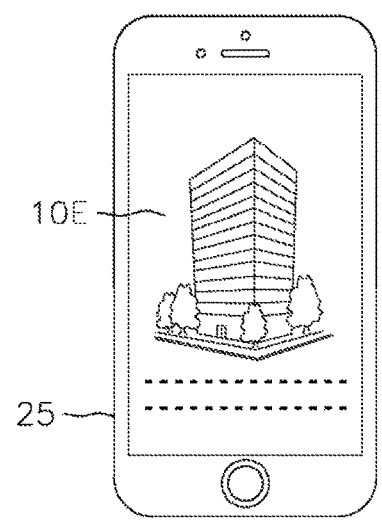
FIG. 15C

SYSTEM AND METHOD FOR DYNAMICALLY EXCHANGING, STORING, UPDATING, AND INTERACTING WITH DIGITAL IDENTITIES ON PORTABLE COMPUTING DEVICES USING INTERFACES, GESTURES AND MONITORED ACTIVITY

CROSS-REFERENCE TO RELATED APPLICATION(S)

This application claims the benefit and the priority of U.S. Provisional Patent Application No. 62/339,751 filed May 20, 2016, the entire content of which is incorporated herein by reference.

BACKGROUND

1. Field

The present disclosure relates generally to a system and method for dynamically exchanging, storing, updating and interacting with digital identities on a smart phone or other portable computing device using specialized user interfaces and gestures, and for automatically generating evaluations concerning the subjects of the digital identities based on monitored actual and online actions of users and their designated peer groups.

2. Description of the Related Art

People often carry business cards, which are small rectangular cuts of cardstock, to quickly provide or exchange information about themselves. Because the business card is a physical object, a person typically carries multiple business cards in a wallet or other container to distribute the business cards in various settings. However, such business cards can be inconvenient because the business cards take up space in the wallet or container of a provider (e.g., a person whose information is contained on the business card) and a receiver (e.g., a person who receives a business card containing information relating to another person).

Further, because business cards are designed to be easily transferred, the business card has a relatively small surface area and is limited in the amount of information that can be included. Further, the information included on the business card is inherently static. The business card may only contain printed text or images, and once the business card is printed, the information reflected thereon cannot be changed or modified without printing new business cards. As such, it can be expensive and time consuming to create modified business cards, and people who have received the business card with out-of-date information will not necessarily receive the new business card with the updated information.

In addition, because the exchange of traditional business cards requires the transfer of physical objects, both the provider and the receiver must be able to exchange the business card, for example, by using their hands. As an example, the provider must typically reach into a pocket or a wallet to retrieve the business card and pass along the business card to the receiver, who will then put the business card in a pocket or wallet. As such, in a busy environment, such as a hospital, it may be difficult for the provider and/or the receiver to exchange the business card. Business cards also typically relate only to a professional persona of a person or to a business, but are not typically used for sharing social contacts.

Many businesses share information via online websites. These online websites, however, often contain very limited information and may be difficult to navigate, particularly when viewed on a mobile device. Further, to visit an online website, a person must determine an address for the website before accessing the website, and the person cannot add additional information to the website for the person's own use. Still further, business cards and websites are often difficult to interact with based on their passive nature.

In addition, with regard to business cards and mobile websites, the person must actively engage with businesses and other people throughout the course of the day to gather information about the business and other people, or must recall each place or person visited to subsequently look up information about the places and people previously encountered. However, this may be difficult when the person is on a tight schedule or visiting multiple places and/or people.

Further, it is inherently difficult to gather and exchange information concerning a particular establishment by solely relying upon a business card or the business's website. Third party websites that provide ratings and reviews of businesses exist, but these sites typically are not tailored to automatically gather, update and exchange customized information and evaluations regarding the business based on a combination of monitored actual and online activities of users and their designated peer groups.

SUMMARY

Embodiments of the present disclosure are directed to a system and method for dynamically exchanging, storing, updating, searching, and interacting with digital identities on a smart phone or other portable computing device using specialized user interfaces and gestures, and for automatically generating evaluations concerning the subjects of the digital identities based on monitored actual and online actions of users and their designated peer groups.

According to one or more embodiments of the present disclosure, a system for storing and searching digital identities includes a mobile device including: a processor; a display coupled to the processor; a user interface device for sending a signal to the processor according to a user input; and a memory storing instructions that, when executed by the processor, cause the processor to: store a plurality of digital identities in the memory, wherein each of the digital identities includes a name of a corresponding user, an address of the corresponding user, a contact email and/or phone number of the corresponding user, and additional characteristics pertaining to the user, displayed in a single screen of the mobile device, and wherein each of the digital identities is updated in real-time; assign a first value to each of the digital identities, the first value including a date on which the respective digital identity was stored in the memory; assign a second value to each of the digital identities, the second value including the address of the corresponding user; assign a third value to each of the digital identities, the third value including a category tag; sort the plurality of digital identities according to a search function upon receipt of a search command, the search command including a search term and an ordered combination of indexing values, each of the indexing values including one of a date, a location, and a category; filter the plurality of digital identities according to an output value of the search function and the search term; order the plurality of digital identities from highest output value to lowest output value according to the filtered plurality of digital identities; and display the ordered plurality of digital identities on the single screen of the mobile device, wherein the digital identities of third parties not associated with the first user are automatically installed on the mobile device based upon one or more of speed, location, distance, duration, network connection, and/or search history.

In some embodiments, the first indexing value includes the date, the second indexing value includes the location, and the third indexing value includes the category.

In some embodiments, one or more of the indexing values is defined as a range of values.

In some embodiments, the search term includes global positioning system coordinates of the mobile device that are automatically transmitted to the memory such that the mobile device sorts and filters the plurality of digital identities according to a real-time location of the mobile device.

In some embodiments, the memory further stores instructions that, when executed by the processor, cause the processor to: send a signal to an adjacent mobile device having one or more second device digital identities stored thereon; cache the one or more second device digital identities in the memory; sort the one or more second device digital identities according to the search function and the search command; filter the one or more second device digital identities with the plurality of digital identities from highest output value to lowest output value to generate a combined filtered list of digital identities; and display the combined filtered list of digital identities on the single screen of the mobile device.

In some embodiments, the search command is input via the user interface device.

In some embodiments, the search command is input via a touch screen having touch screen sensitivity, a gyroscope and movement of the mobile device, and/or a microphone and voice recognition software.

In some embodiments, the phone numbers of the digital identities are configured to actuate the mobile device such that when the digital identity is displayed on the single screen of the mobile device, the first user may initiate a phone call between the mobile device and a phone associated the phone number of the digital identity.

In some embodiments, the digital identities of the third parties are temporarily stored on the mobile device.

One or more embodiments of the present disclosure are directed to a method of searching digital identities, the method including: storing a plurality of digital identities in a memory of a mobile device, the mobile device including: a processor; a display coupled to the processor; a user interface device for sending a signal to the processor according to a user input; and a memory storing instructions, wherein each of the digital identities includes a name of a corresponding user, an address of the corresponding user, a contact email and/or phone number of the corresponding user, and additional characteristics pertaining to the user, displayed in a single screen of the mobile device, and wherein each of the digital identities is updated in real-time; assigning a first value to each of the digital identities, the first value including a date on which the respective digital identity was stored in the memory; assigning a second value to each of the digital identities, the second value including the address of the corresponding user; assigning a third value to each of the digital identities, the third value including a category tag; sorting the plurality of digital identities according to a search function upon receipt of a search command, the search command comprising a search term and an ordered combination of indexing values, each of the indexing values including one of a date, a location, and a category; filtering the plurality of digital identities according to an output value of the search function and the search term; ordering the plurality of digital identities from highest output value to lowest output value according to the filtered plurality of digital identities; and displaying the ordered plurality of digital identities on the single screen of the mobile device, wherein the digital identities of third parties not associated with the first user are automatically installed on the mobile device based upon one or more of speed, location, distance, duration, network connection, and/or search history.

In some embodiments, one or more of the indexing values is defined as a range of values.

In some embodiments, the search term includes global positioning system coordinates of the mobile device that are automatically transmitted to the memory such that the mobile device sorts and filters the plurality of digital identities according to a real-time location of the mobile device.

In some embodiments, the method further includes: sending a signal to an adjacent mobile device having one or more second device digital identities stored thereon; caching the one or more second device digital identities in the memory; sorting the one or more second device digital identities according to the search function and the search command; filtering the one or more second device digital identities with the plurality of digital identities from highest output value to lowest output value to generate a combined filtered list of digital identities; and displaying the combined filtered list of digital identities on the single screen of the mobile device.

In some embodiments, the phone numbers of the digital identities are configured to actuate the mobile device such that when the digital identity is displayed on the single screen of the mobile device, the first user may initiate a phone call between the mobile device and a phone associated the phone number of the digital identity.

In some embodiments, the digital identities of the third parties are temporarily stored on the mobile device.

BRIEF DESCRIPTION OF THE DRAWINGS

These and other features and aspects of embodiments of the present disclosure will be better understood by reference to the following detailed description, when considered in conjunction with the accompanying drawings. Like numbers are used throughout the figures to reference like features and components. The figures are schematic in nature and may not be drawn to scale.

FIG. 2 is a flow chart illustrating a method of sharing a digital identity according to one or more embodiments of the present disclosure.

FIGS. 3A-3C illustrate a schematic view of an operation of sharing a digital identity according to one or more embodiments of the present disclosure.

FIGS. 15A-15D illustrate a schematic view of an operation of acquiring and reviewing a digital identity according to one or more embodiments of the present disclosure.

DETAILED DESCRIPTION

Figure 1:
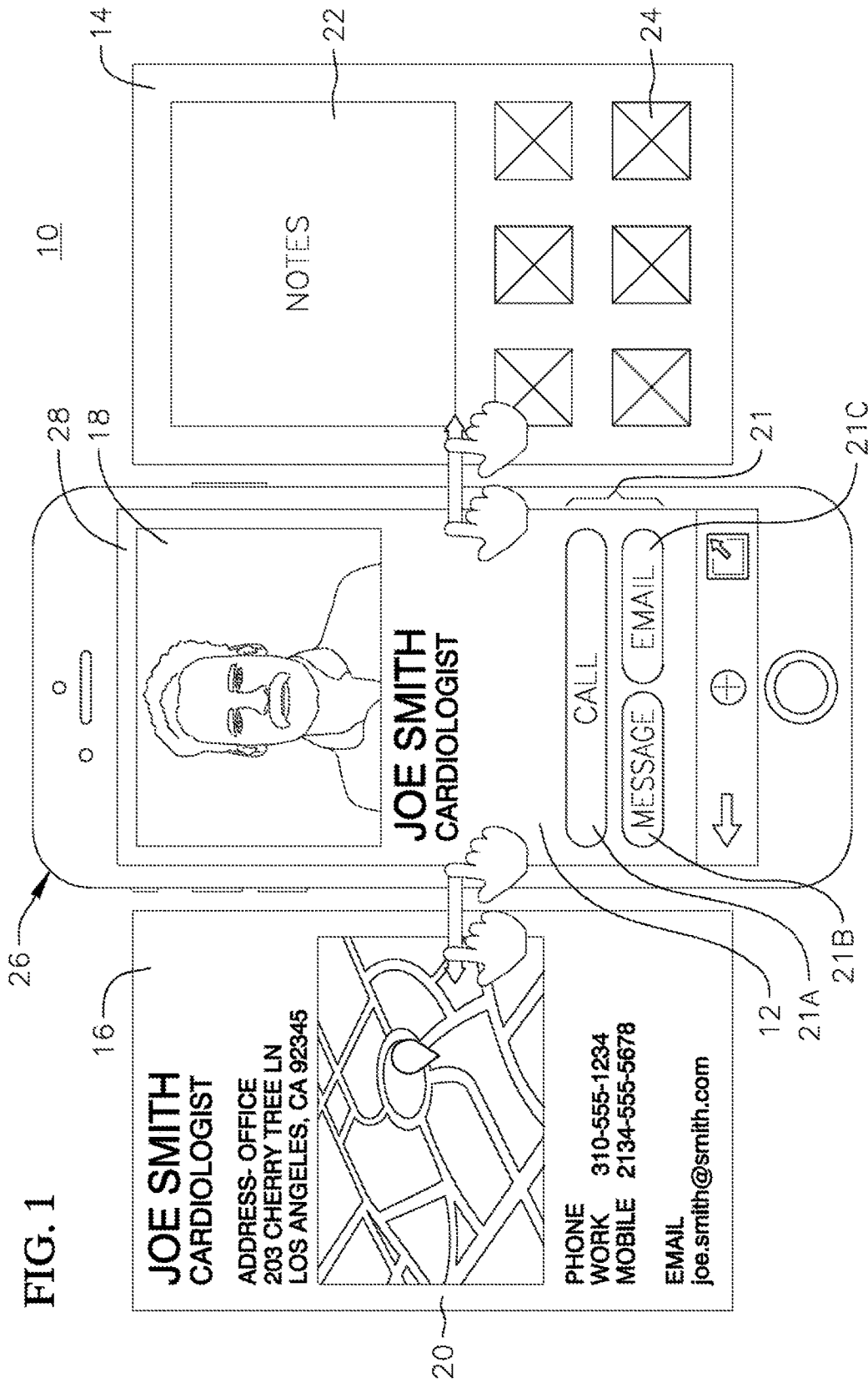
FIG. 1 is a front elevational view of a digital identity according to one or more embodiments of the present disclosure.

Embodiments of the present disclosure relate to a system and method for dynamically exchanging, storing and updating digital identities, and further for automatically gathering, updating and exchanging customized information and evaluations regarding the subjects of the digital identities based on a combination of monitored actual and online activities of users and their designated peer groups. The system and method further provides specialized user interfaces for facilitating interaction with the digital identities on touch screen devices, such as smart phones or tablets.

In addition, according to embodiments of the present disclosure, various sensors, global positioning systems (GPS), cameras, microphones, etc. of the touch screen devices are utilized so that a user's actions and interactions in the real world may be transferred and captured by the touch screen device by manipulating placement and/or orientation of the touch screen device, and other interactions with the touch screen device. These features of the touch screen device may be used for exchanging the digital identities (e.g., GPS, cameras for image capture and/or augmented reality), storing the digital identities (e.g., microphones and voice recognition software, gyroscope, accelerometer, touch screen sensitivity), updating the digital identities (e.g., microphones and voice recognition software, gyroscope, accelerometer, touch screen sensitivity), and interacting with the digital identities (e.g., microphones and voice recognition software, gyroscope, accelerometer, touch screen sensitivity). In some embodiments, interaction with the digital identities may be influenced by the user's interactions in the real world in combination with the user's online and/or social media activity.

The drawings depict some example embodiments as applied to the system and method for illustrative purposes only, and it will be apparent that modifications may be made without departing from the spirit and scope of the disclosure, and also that the present disclosure may be used in other applications in the same or similar fields. Although relative terms such as "first," "second," "front," "back," etc. have been used herein to describe relative relationships between elements, it is to be understood that these terms are not intended to be limiting, but are instead used to distinguish one element from another. Moreover, the figures contained in this application are not necessarily drawn to scale.

One or more embodiments of the present disclosure are directed to a method of dynamically exchanging and storing digital identities (DIs) 10. First, a user 100 may determine what information the user would like to include in the DI 10. As used herein, the term "user" may refer to an individual, a corporation, a small business, etc. For convenience of description, reference is made to multiple users. As used herein, a first user 101, a second user 102, a third user 103, and a fourth user 104 each refer to individual users, and a fifth user 105, a sixth user 106, a seventh user 107, and an eighth user 108 each refer to business users. For convenience of explanation, each of these users has a corresponding DI 10, referred to as a first DI 10A corresponding to the first user 101, a second DI 10B corresponding to the second user 102, a third DI 10C corresponding to the third user 103, a fourth DI 10D corresponding to the fourth user 104, a fifth DI 10E corresponding to the fifth user 105, a sixth DI 1OF corresponding to the sixth user 106, a seventh DI 10G corresponding to the seventh user 107, and an eighth DI 10H corresponding to the eighth user 108. In addition, each user 100 may have multiple DIs 10, each relating to a "persona" of the user 100. For example, each user 100 may have four DIs, but the present disclosure is not limited thereto or thereby. Herein, reference is made to a user 100 having a "public" DI, a "professional" DI, a "personal" DI, and a "private" DI. As used herein, when any distinction(s) between the various DIs associated with the same user may be relevant, reference is made to the first user 101 having a first public DI 10A1, a first professional DI 10A2, a first personal DI 10A3, and a first private DI 10A4, the second user 102 having a second public DI 10E31, a second professional DI 10B2, a second personal DI 10B3, and a second private DI 10B4, etc. However, the present disclosure is not limited thereto or thereby and any reference to a specific user, a specific characteristic of a user, or a specific DI is merely to enhance clarity of embodiments of the present disclosure. In some embodiments, the user 100 may generate one DI 10, and designate specific information to be associated with each "persona," such that the public DI contains less information than the private DI, etc. In other embodiments, the user 100 may generate one or more DIs 10 to correspond to one or more "personas."

Referring to FIG. 1, a user 100 may develop a DI 10, which contains information pertaining to the user 100. The DI 10 may include a first page 12, a second page 14, and/or a third page 16. For example, the first page (or a first side or a front side) 12 of the DI 10 may include personal identification information. Referring to the exemplary embodiment illustrated in FIG. 1, the first page 12 of the DI 10 may include an image 18. The image 18 may include, for example, a photograph (e.g., a photograph of the user 100, a photograph of an object, etc.), an avatar, artwork, a moving image (such as a .gif file, a .mov file, or a video file), a rotating image, an animation, a three-dimensional image, a .sag file, a .jpg file, a .png file, etc. For example, when the user 100 (e.g., the first user 101) is a doctor, the user 100 may utilize a photograph of the user 100 in a white coat (e.g., for the image 18 of the first professional DI 10A2); when the user 100 (e.g., the fifth user 105) is a small business, the user 100 may utilize a photograph of a storefront of the business, a logo associated with the business, etc.; when the user 100

(e.g., the sixth user 106) is a specialized business, the user 100 may utilize a photograph or depiction of their specialty goods, such as a painting. In some embodiments, the first page 12 of the DI 10 may include multiple images 18, which may be alternately or concurrently displayed. For example, a user may contact the image 18 with a finger and swipe the finger (e.g., swipe the finger to the right or left) so that different images 18 may be displayed.

The first page 12 of the DI 10 may include data architecture in fixed data fields, for example, a .vcf file, etc. The first page 12 of the DI 10 may further include an information section 20. The information section 20 may include information relating to the user 100. For example, in some embodiments, the information section 20 may include contact information such as a phone number, an email address, an address, and/or a link to a website run by or affiliated with the user 100. In some embodiments, the information section 20 may include location information, such as the user's business address.

As illustrated in FIG. 1, in some embodiments, the first page 12 may include a button or buttons 21 which are linked to content displayed in the information section 20, and the information section 20 may be included on the third page 16, as discussed further below. The first page 12 may include two buttons 21A and 21B, which are linked to the user's phone number, and a button 21C, which is linked to the user's email address. As a non-limiting example, the button 21A may be defined as a call button, the button 21B may be defined as a message button, and the button 21C may be defined as an email button. As such, when a user (e.g., the first user 101) engages (e.g., contacts) the button 21A on the DI 10 (e.g., the second DI 10B), a device (e.g., a smartphone) may access the second user's phone number associated with the second DI 10B and may initiate (or actuate) a phone call to the second user's phone number. Similarly, when the first user 101 engages the button 21B, the device may access the second user's phone number associated with the second DI 10B and may activate a text or SMS messaging application to send a message to the second user 102 via the second user's phone service provider. Further, the DI 10 and a contact list of the device may be closely integrated, such that when the DI 10 is added to the device, the information relating to the DI 10 may be used to populate information in the contact list of the device (e.g., the contact list may be populated with identifying information such as a name, phone number, address, etc.).

The DI 10 further includes the second page (e.g., a second side or a back side) 14. The second page 14 of the DI 10 may include a notes section 22. The notes section 22 may include a space (e.g., a blank space) for another user to add information to the DI 10. For example, the second user 102 may add information to the first user's DI 10A by adding notes or incorporating other information in the notes section 22. In some embodiments, the second page 14 of the DI 10 may include one or more parallel lines corresponding to the notes section 22. The notes section 22 may accommodate, for example, text, pictures, video, audio, etc.

In some embodiments, the second page 14 of the DI 10 may also include a rating section 24. The rating section 24 allows users to assign a rating or value to other DIs 10, and may include one or more stars, a number rating system, etc. For example, the first user 101 may acquire the fifth DI 10E and then assign a rating to the fifth DI 10E, for example, three stars, to classify and compare the fifth DI 10E of the fifth user 105 with the DI 10 of another user, for example, the sixth DI 10F.

In some embodiments, the second page 20 of the DI 10 may include additional information provided by the user 100. For example, the second side 20 may include additional information, pictures, links, logos, etc. relating to the user 100.

In some embodiments, the DI 10 may include the first page 12 and the second page 14. As such, the first page 12 may correspond to a first (or front) side of the DI 10, and the second page 14 may correspond to a second (or back) side of the DI 10. In some embodiments, to alternate a display of the DI 10 between the first page 12 and the second page 14, the DI 10 may also include a toggle. By activating the toggle, the DI 10 may be "flipped" from the first page 12 to the second page 14. In other words, by activating the toggle on the first page 12, the second page 14 of the DI 10 may be displayed. In some embodiments, the toggle may include an arrow, a slidable button, etc. The second page 14 also includes the toggle such that contacting/activating the toggle on the second page 14 "flips" the DI 10 back to the front page 12. In some embodiments, the DI 10 may be "flipped" when a user contacts or taps any portion of the first page 12 or the second page 14. In other embodiments, the user may alternate between the first page 12 and the second page 20 by swiping the DI 10 in a direction, for example to the left or to the right.

In some embodiments, the DI 10 may further include the third page 16. The third page 16 may include the information section 20 and may include additional information (or information in greater detail) relative to the first page 12. For example, the third page 16 may include the first user's name, occupation, address, phone number, email address, and a map corresponding to the address. In some embodiments, the third page 16 may also include a toggle so that the DI 10 may be "flipped" between the first page 12, the second page 14, and the third page 16. In some embodiments, the first, second, and third pages 12, 14, and 16 may be alternatively displayed according to a swipe on a screen of a device displaying the DI 10. For example, as a non-limiting example, by contacting the screen while the first page 12 is displayed with a finger and swiping to the right, the third page 16 may be displayed, and by contacting the screen while the first page 12 is displayed with the finger and swiping to the left, the second page 14 may be displayed. Similarly, by clicking and holding a mouse on the first page 12 displayed on a screen and dragging to the right or the left, or by clicking a right edge or a left edge of the DI 10, the second page 14 or the third page 16 may be displayed.

In some embodiments, the DI 10 may have only one page (or side). In other embodiments, the DI 10 may have two or more pages (or sides).

The DI 10 may have a size that corresponds to a size of a screen 28 of a device (e.g., a smartphone) 26. For example, the DI 10 may have a substantially rectangular shape with a length extending along a first direction and a width extending along a second direction perpendicular or substantially perpendicular to the first direction. In some embodiments, the length of the DI 10 may correspond to a length of the screen 28 of the device 26 (e.g., a portion of the device 26 that has pixels) and the width of the DI 10 may correspond to a width of the screen 28. As such, the DI 10 corresponds to the screen 28 of the device 26 in its entirety. In other embodiments, the DI 10 may have a size that is less than a size of the screen 28 of the device 26. For example, the width of the DI 10 may correspond to the width of the screen 28, while the length of the DI 10 is less than the length of the screen 28. In some embodiments, the DI 10 may have any suitable shape such that it may be displayed on the screen 28 of the device 26. For example, the DI 10 may have a round shape, a triangular shape, an asymmetrical shape, etc. In some embodiments, the first user may select the shape of the DI 10 to further distinguish the first user's DI 10 from the DI 10 of another user. In some embodiments, the DI 10 may have a three-dimensional shape. As is known in the art, a view (or zoom) of the DI 10 may be adjustable such that a user may manipulate the view of the DI 10 to zoom on a portion of the DI 10. For example, the user may "pinch and zoom" by tapping and sliding two or more fingers on the screen 28 of the device 26 to zoom on a portion of the DI 10. As such, the DI 10 may appear to be larger than the screen 28 because only a portion of the DI 10 is visible on the screen 28.

Because the DI 10 is created digitally, the DI 10 may be easily modified after it has been created. For example, if the user 100 obtains a new telephone number, instead of creating a new DI 10, the user 100 may simply update the telephone number associated with (and displayed on) the DI 10. As such, the DI 10 may be modified and/or updated at any time after it has been created to reflect changes in preference, status, fact, etc.

One or more embodiments of the present disclosure are also related to a system for storing and/or sharing or exchanging digital identities. For example, the system may be used in any apparatus (or a combination of apparatuses) having a memory (e.g., the memory storage device 29) and a screen (e.g., the screen 28). As such, as non-limiting examples, the system may be used on a smartphone (e.g., a smartphone software application), a laptop computer, a personal computer, glasses, or a watch. The memory storage device 29 and screen 28 may each be formed in a single apparatus (e.g., a smartphone with preloaded software), or various components may be combined or externally connected (e.g., the screen 28 may be connected to an external memory storage device).

In one or more embodiments of the present disclosure, a program (e.g., an application, or a software application) 30 is utilized for creating, displaying, exchanging, and/or storing one or more of the DIs 10. The program 30 may be installed on a first device (e.g., a smartphone) 25 of the first user 101. When the program 30 is opened (or accessed), the program 30 accesses any DIs 10 that the first user 101 has created (or generated) and any DIs 10 that the first user 101 has received (e.g., the second DI 10B from the second user 102 and the fifth DI 10E from the fifth user 105). Referring to FIG. 2, the first user 101 may utilize the program 30 to create the DI 10A (S100). For example, when the program 30 is activated, the first user 101 may designate a shape, size, and/or orientation of the first DI 10A. The first user 101 may also populate the first DI 10A. For example, the first user 101 may select or add the image 18 and the information section 20. The image 18 may be added (e.g., downloaded or uploaded) from an external source or a gallery stored on the first device 25, or the program 30 may interact with a camera (e.g., a camera of the first device 25) and directly add a picture or video captured with the camera as the image 18. In some embodiments, the first user 101 may personalize the first DI 10A by modifying images, color, information, dimensions, etc. on the first, second, and/or third pages 12, 14, 16 of the first DI 10A. The program 30 writes the first DI 10A into the memory 29 so that the first DI 10A may be recalled (S110). The memory 29 may be, for example, an internal memory on the first device 25, an external memory such as a microSD card or other external memory card, or may be a cloud storage. In some embodiments, the first user 101 may generate the first public DI 10A1, the first professional DI 10A2, the first personal DI 10A3, and the first private DI 10A4, and the first public DI 10A1, the first professional DI 10A2, the first personal DI 10A3, and the first private DI 10A4 may be stored in the memory 29. In addition, once any DI 10 is created, it may be stored in a global database.

For convenience of explanation, reference is made herein to DIs 10 that are stored in the memory 29 of the device 26. However, it will be appreciated that the DI 10 may be stored on an external server or at another external location, accessed via the device 26, and temporarily cached on the device 26. As such, the DI 10 may be associated with an account of a user 100, as opposed to being associated with a particular device 26.

In some embodiments, the first DI 10A may be generated by scanning or otherwise importing a traditional business card 32. For example, the program 30 may access a camera of the first device 25 and may use the camera to capture a picture of the business card 32. A front side of the business card 32 may then be saved as the first page 12 of the first DI 10A and a back side of the business card 32 may then be saved as the second page 14 of the first DI 10A. The first DI 10A may then be altered or modified by the first user 101.

According to one or more embodiments, the first DI 10A may be shared with one or more other users. For example, the first DI 10A may be shared via the program 30, SMS, near-field communication, etc. Further, it will be appreciated that the program 30 may utilize SMS, near-field communication, Wi-Fi, Bluetooth, manual entry, etc. For example, the first DI 10A may be shared with the second user 102 having a second device 27. The program 30 may be installed on the second device 27.

In some embodiments, the first DI 10A may be shared with the second user 102 according to one or more parameters 32 (S120). For example, the parameter(s) 32 may include a geographic parameter 32A, a distance parameter 32B, a network parameter 32C, a duration parameter 32D, and/or a speed parameter 32E. Further, the parameter 32 may be a combination (e.g., a weighted combination) of multiple parameters, such as, for example, the proximity parameter 32B and the duration parameter 32E. As discussed further below, in some embodiments, sharing between the first user 101 and the second user 102 may be automatic (or passive), and in other embodiments, sharing may be manual (or active).

In some embodiments, the first DI 10A may be shared with the second user 102 according to the geographic parameter 32A. For example, a geographic tag may be associated with the first DI 10A at particular coordinates that are compatible with global positioning system (GPS) devices. As such, when the second device 27 having GPS tracking capabilities encounters the geographic tag (or crosses the coordinates of the first DI 10A), the first DI 10A may be transmitted to (or shared with) the second device 27.

In some embodiments, the first DI 10A may be shared with the second user 102 according to the distance parameter 32B. For example, when the first user 101 and the second user 102 are within a distance (e.g., a predetermined distance) from each other, the first DI 10A may be transmitted to the second device 27. For example, the distance may be specified as 20 feet, and when the second device 27 is twenty feet or fewer from the first device 25, the first DI 10A may be transmitted to the second device 27.

In some embodiments, the first DI 10A may be shared with the second user 102 according to the network parameter 32C. For example, when the first device 25 is in communication with a network 34 (e.g., a Wi-Fi network, a LAN network, etc.) and the second device 27 joins (or connects to or communicates with) the network 34, the program 30 may transmit the first DI 10A to the second device 27.

In some embodiments, the first DI 10A may be shared with the second user 102 according to the duration parameter 32D. For example, when the second device 27 is in a location adjacent the first device 25 for an amount of time (e.g., a predetermined amount of time), for example, ninety seconds, the program 30 may transmit the first DI 10A to the second device 27 when the second device 27 and the first user 101 have been adjacent for the amount of time. In other words, as a non-limiting example, the duration parameter 32D may facilitate exchange of the first DI 10A when a device 26 has been within 20 feet of the first device 25 for ninety seconds.

In some embodiments, the speed parameter 32E may be utilized to reduce the likelihood of unintentional sharing of the DI 10. The speed parameter 32E may use GPS or similar technology to ascertain the speed at which the user's device 26 (e.g., the second device 27) is moving. As another example, the speed parameter 32E may send a first signal containing distance information from the second device 27 to the first device 25 when another parameter is met (e.g., the distance parameter 32B) and a second signal containing distance information to the first device 25 after a lapse in time (e.g., a predetermined lapse in time) and calculating the change in distance over the lapse in time to determine the speed at which the second device 27 is moving. In some embodiments, the speed parameter 32E may be set at 4 miles per hour (mph) or less. As such, if the device 26 is moving at a speed greater than 4 mph (e.g., if the device 26 is in an automobile), the speed parameter 32E is not met and the DI 10 is not transferred.

In one or more embodiments, a plurality of parameters 32 initiate sharing of the DI 10. For example, to initiate sharing of the DI 10, the proximity parameter 32B, the duration parameter 32D, and the speed parameter 32E may each need to be met. For example, the proximity parameter 32B may be set at 20 feet, the duration parameter 32D may be set at 90 seconds, and the speed parameter 32E may be set at 4 mph or less. As such, sharing of the first DI 10A will be initiated when the second user 102 has been within 20 feet of the first device 25 for at least 90 seconds, so long as the second device 27 is moving at 4 miles per hour or slower. In some embodiments, the plurality of parameters 32 must be concurrently met. In some embodiments, the plurality of parameters 32 must be continuously met (e.g., the second user 102 must be continuously within 20 feet of the first device 25 for 90 consecutive seconds and at a speed of 4 mph or less). In other embodiments, the plurality of parameters 32 may be met cumulatively.

When the parameter(s) 32 are met, the second device 27 sends a signal to the first device 25 to initiate transfer of the first DI 10A (S130). The first device 25 then recalls the first DI 10A from the memory 29 (S140). The first DI 10A is then transmitted from the first device 25 to the second device 27 (S150), and the first DI 10A is then stored in the memory 29 of the second device 27 (S160).

The first DI 10A may be shared with the second device 27 according to one or more methods. For example, as discussed above, the first DI 10A may be transmitted to the second device 27 when the parameter(s) 32 are met. In more detail, referring to FIGS. 3A-3C, when the parameter(s) 32 are met, the second device 27 may send a signal to the first device 25 that the parameter(s) 32 have been met, and the first device 25 may then transmit the first DI 10A to the second device 27. It will be appreciated that although the first user 101 and the second user 102 are illustrated with the first device 25 and the second device 27 available for active interaction, that according to embodiments of the present disclosure, the first DI 10A may be transmitted to the second device 27 (and the second DI 10B may be transmitted to the first device 25), regardless of whether the first and second users 101, 102 are respectively engaged with the first and second devices 25, 27.

Both sharing and receiving of the DI 10 may be automatic (or passive) and/or manual (or active). For example, in some embodiments, the first DI 10A may be automatically shared by the first device 25 when the parameter(s) 32 are met. In other embodiments, the program 30 may indicate that the first DI 10A is ready for transfer (for example, via push notification or other notification) when the parameter(s) 32 are met, and the first user 101 may make the first DI 10A available for sharing with the second user 102. Similarly, the first DI 10A may be automatically transmitted to the storage 28 of the second device 27 when the parameter(s) 32 are met, or the program 30 may indicate that the first DI 10A is ready for transfer (for example, via push notification or other notification) when the parameter(s) 32 are met, and the second user 102 may elect to receive the first DI 10A.

Figure 4:
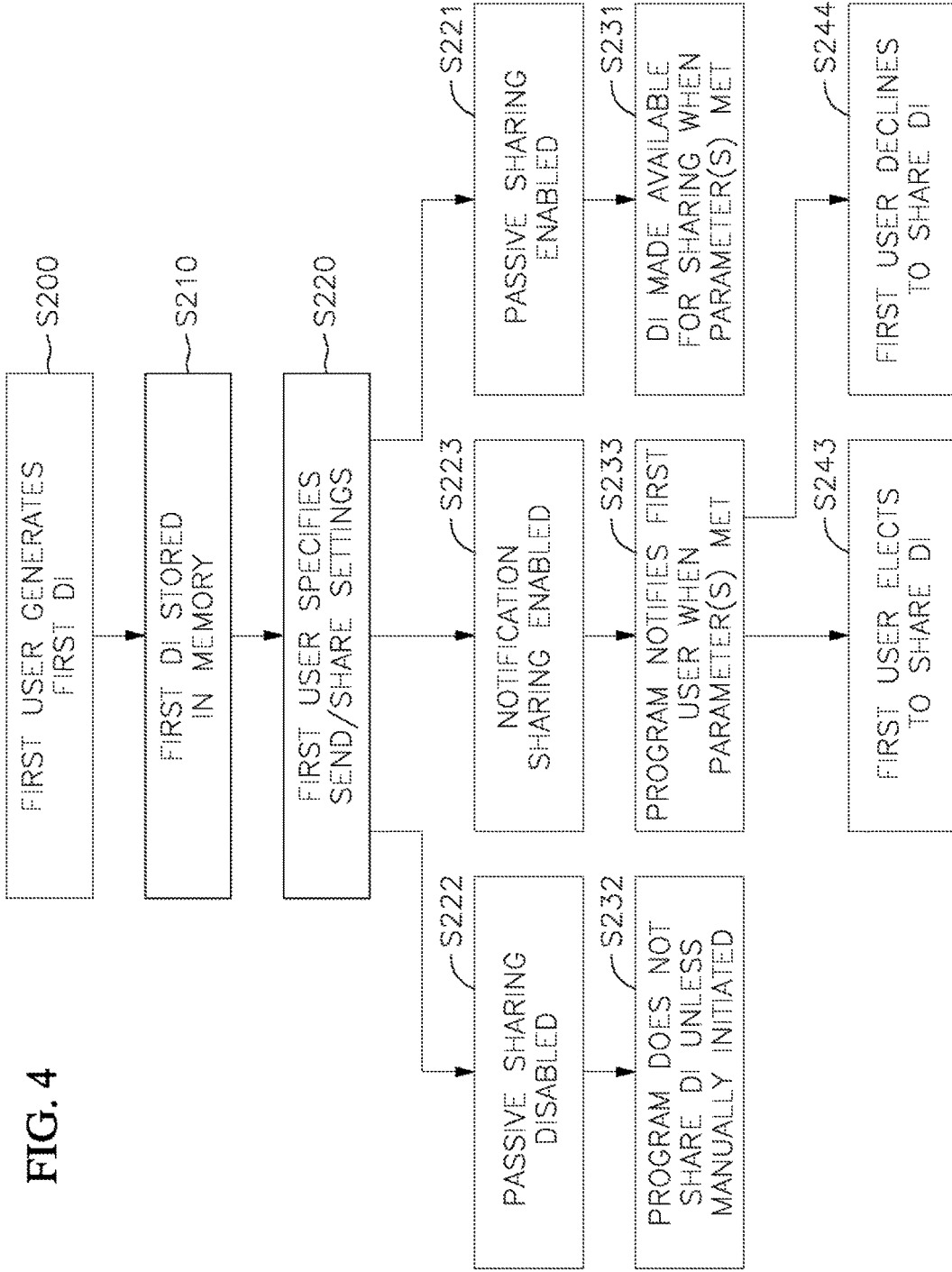
FIG. 4 is a flow chart illustrating a method of sharing a digital identity according to one or more embodiments of the present disclosure.

Referring to FIG. 4, in some embodiments, the above described automatic and/or manual sharing may be achieved by means of activating or deactivating passive sharing, and/or by activating "notification sharing." First, the user 100 (e.g., the first user 101) generates or creates the DI 10 (e.g., the first DI 10A) (S200) and stores the DI 10 in the memory 29 (S210). The first user 101 then specifies send (or share) settings for sharing the first DI 10A (S220) by enabling passive sharing (S221), disabling passive sharing (S222), or enabling notification sharing (S223). When passive sharing is enabled (S221), the first DI 10A may be made available (e.g., automatically made available) for download whenever the parameter(s) 32 are met, regardless of whether the first device 25 is actively being used (S231). When passive sharing is disabled (S222), the first DI 10A may only be shared with another user 100 if sharing is manually initiated by the first user 101 (S232). In addition, the first user 101 may enable "notification sharing," wherein the first user 101 may be notified that the parameter(s) 32 have been met (S233). The first user 101 may then elect to share the first DI 10A with the user 100 (S243) or decline to share the first DI 10A (S244) with the user 100. Similarly, as discussed further below, the second user 102 may enable or disable passive downloading of the DI 10A for managing receipt of the DI 10.

In some embodiments, the program 30 may allow for push notifications when the parameter(s) 32 are met. For example, when the distance parameter 32B, the duration parameter 32D, and the speed parameter 32E are met, the second user 102 may receive a push notification informing the second user 102 that the first DI 10A is available for download. The second user 102 may then elect whether to download the first DI 10A. In other embodiments, the first DI 10A may be automatically downloaded to the second device 27 when the parameter(s) 32 are met. In some embodiments, the second user 102 may receive a push notification indicating that the first DI 10A has been downloaded.

Accordingly, the first DI 10A may be shared with or made available to the second user 102 when the parameter(s) 32 are met, regardless of whether the first user 101 or the second user 102 respectively engages with the first device 25 or the second device 27. As such, the DI 10 may be transferred seamlessly without the need for either user to interact with the respective devices 26.

Figure 5:
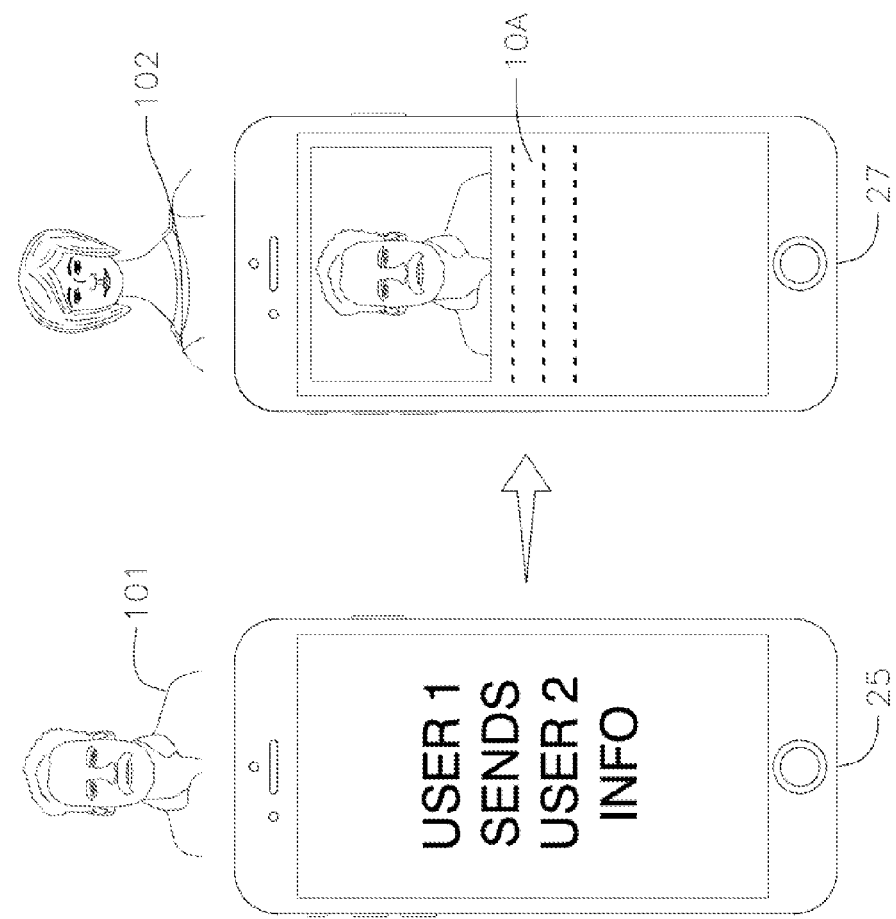
FIG. 5 is a schematic view of an operation of sharing a digital identity according to one or more embodiments of the present disclosure.
Figure 6:
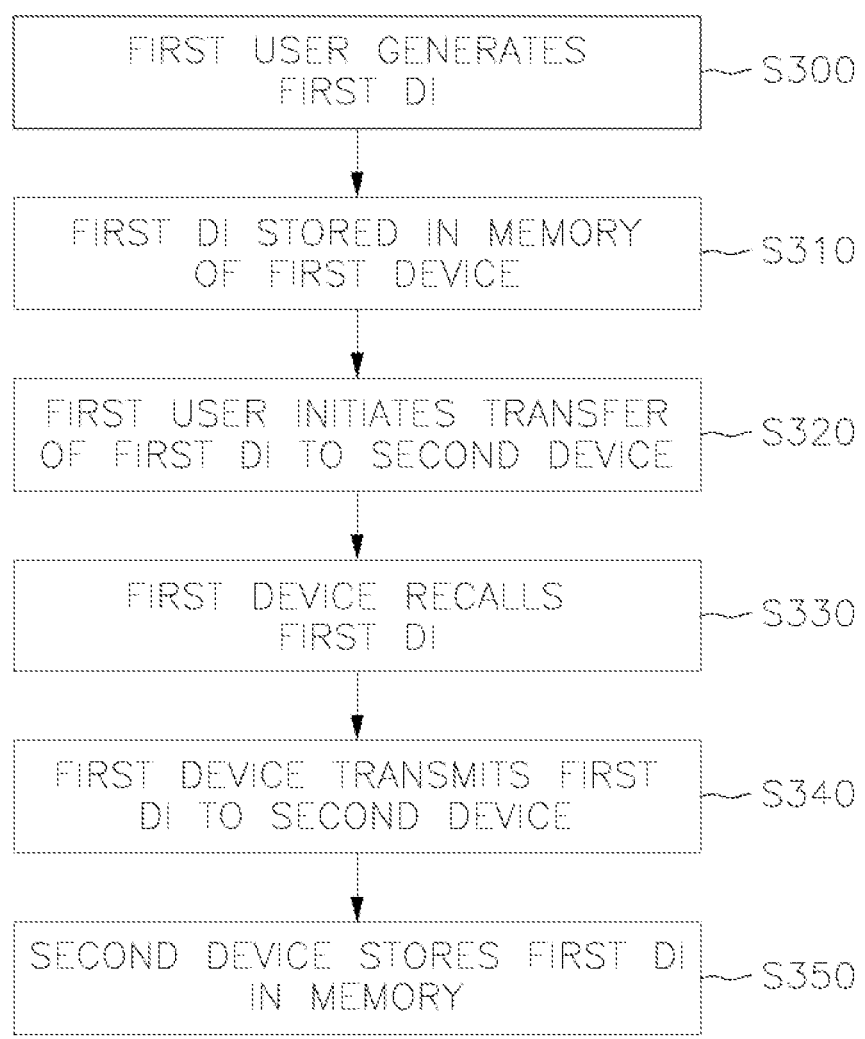
FIG. 6 is a flowchart illustrating a method of sharing a digital identity according to one or more embodiments of the present disclosure.

According to one or more embodiments of the present disclosure, the first DI 10A may be shared manually by the first user 101. For example, referring to FIGS. 5 and 6, the first user 101 may generate the first DI 10A (S300), which is then stored in the memory 29 of the first device 25 (S310). The first user 101 may then initiate transfer of the first DI 10A to the second device 27 (S320). For example, to initiate transfer of the first DI 10A, the first user 101 may use the program 30 or may share the first DI 10A via SMS or other messaging services. The first device 25 then recalls the first DI 10A (S330) and transmits the first DI 10A to the second device 27 (S340). The first DI 10A is then received by the second device 27 and stored in the memory 29 of the second device 27 (S350).

Figure 7:
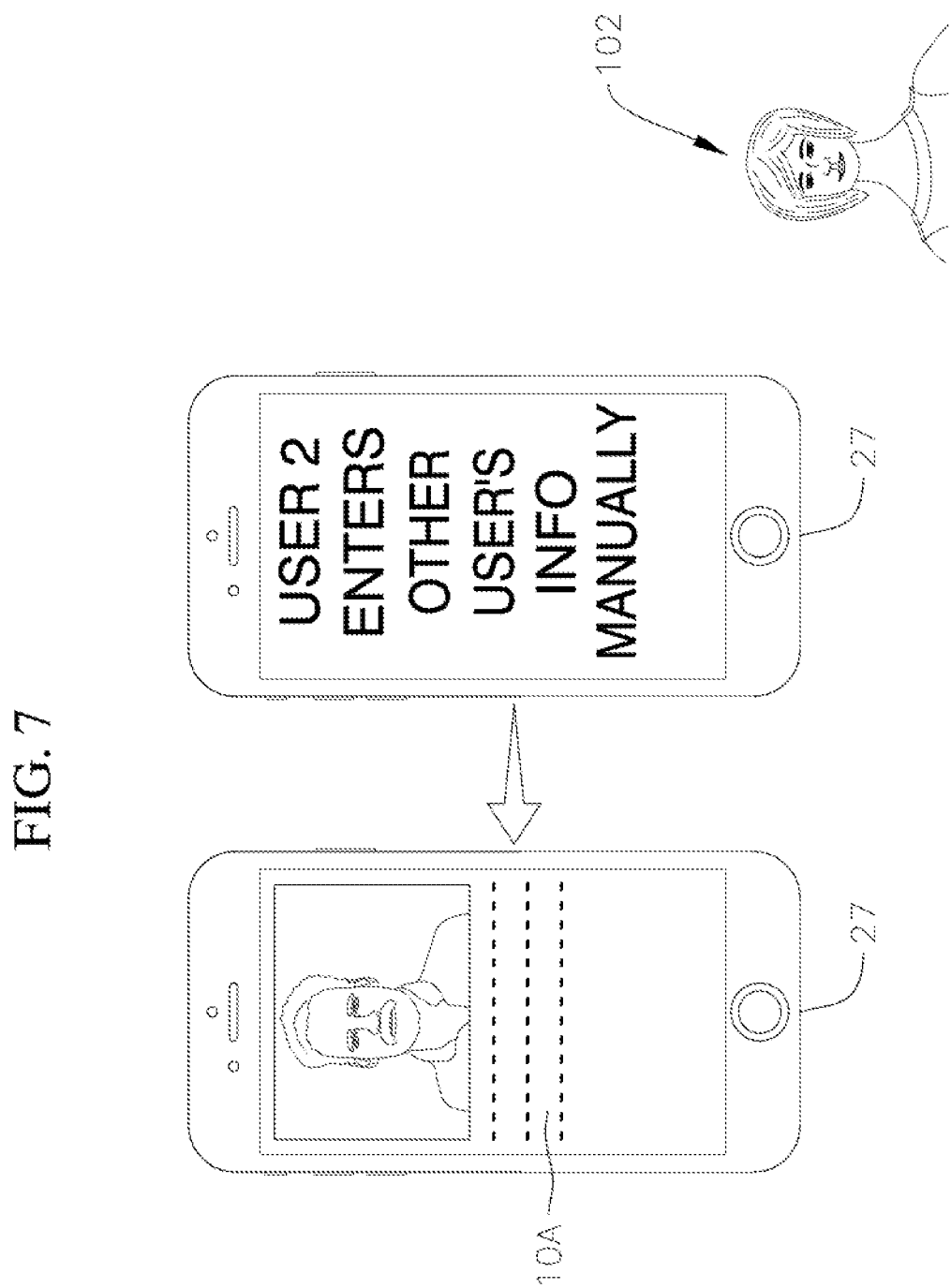
FIG. 7 is a schematic view of an operation of sharing a digital identity according to one or more embodiments of the present disclosure.

As another example, the first DI 10A may be manually entered directly into the second device 27. Referring to FIG. 7, the second user 102 may input information relating to the first user 101 into the program 30 to generate a DI 10 relating to the first user 101. The DI 10 may then be stored in the memory 29 of the second device 27.

In some instances, multiple DIs 10 may meet the parameter(s) 32. For example, when the second device 27 is in a crowded area, such as a hospital, the distance parameter 32B and the duration parameter 32D may both be met by more than one DI 10. In some embodiments, the second device 27 may collect and store the multiple DIs 10 in the memory 29. In other embodiments, the program 30 may include a search feature which allows the second user 102 to search through the available DIs 10 (e.g., to search through DIs 10 that meet one or more of the parameters 32). As such, the second user 102 may acquire and catalog the first DI 10A of the first user 101 without obtaining (or storing) the other DIs 10 available at the same location. As discussed further below, the second user 102 may search the program 30 contemporaneously (e.g., while the second user 102 is at the location) or at a later point in time.

In some embodiments, the first DI 10A and the second DI 10B may be exchanged via the program 30. In other words, the first DI 10A may be shared from the first device 25 and received by the second device 27 and the second DI 10B may be shared from the second device 27 and received by the first device 25.

It will be appreciated that although reference is made to sharing between two devices 26 (e.g., the first device 25 and the second device 27), in some embodiments, the first user 101 may broadcast the first DI 10A once it is stored in the memory 29, which, as described above, may be external to the first device 25. In other words, the first DI 10A may be stored in cloud storage and may be made available for sharing according to the parameter(s) 32. As such, the first DI 10A may be shared according to a peer-to-peer network, or may be broadcast any time the parameter(s) 32 are met, regardless of whether the first device 25 is on or off, and regardless of the physical location of the first device 25.

When the second user 102 receives the first DI 10A via the program 30, the first DI 10A is stored in the storage 29 of the second device 27. For example, the first DI 10A may be stored on a memory card or internal memory drive. As another example, the first DI 10A may be stored on an internal non-volatile memory (e.g., integrated flash memory) or dynamic random access memory (RAM or DRAM) or on a removable memory card (e.g., a Secure Digital (SD) card). In one or more embodiments, the memory 29 is RAM, which allows for the first DI 10A to be stored and accessed relatively quickly. In some embodiments, the memory 29 may be more than one type of memory, for example, both dynamic RAM and a non-volatile memory. In one or more embodiments, the first DI 10A is cached for more efficient retrieval of the first DI 10A at a later point in time.

The second user 102 may store or retrieve the first DI 10A after the first DI 10A is received by the second device 27. For example, when the second user 102 recalls the first DI 10A, the first DI 10A may appear on the screen 28 of the second device 27 such that the first page 12 of the first DI 10A is visible. The second user 102 may then navigate between the first page 12, the second page 14, and/or the third page 16 of the first DI 10A. When the second page 14 of the first DI 10A is displayed, the second user 102 may add notes or comments to the notes section 22. When the second user 102 recalls the first DI 10A at a later time (e.g., weeks later), the notes may appear in the notes section 22.

In some embodiments, the first DI 10A may be stored contemporaneously in the memory 29 of the second device 27. In some embodiments, the first DI 10A may be contemporaneously stored in a temporary cache and subsequently moved to a more permanent storage, such as the cloud or non-volatile memory.

Figure 8:
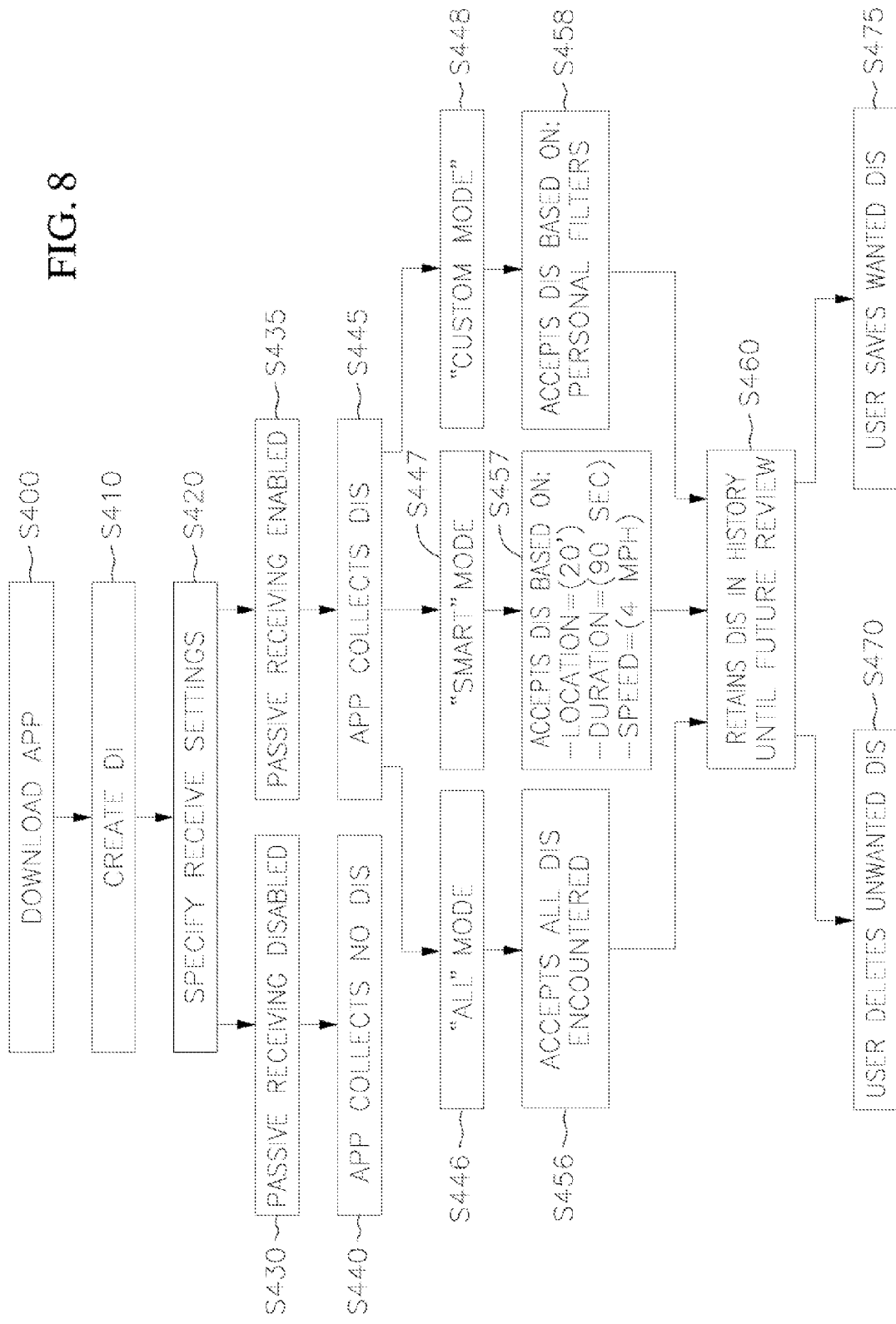
FIG. 8 is a flow chart illustrating a method of receiving multiple digital identities according to one or more embodiments of the present disclosure.

In some embodiments, the program 30 may be utilized to collect a plurality of DIs 10 during a period of time, for example, during a day. Referring to an example embodiment illustrated in FIGS. 8 and 9, the first user 101 may download or install the program 30 on the first device 25 (S400). The first user 101 may then create an account and create the first DI 10A (S410). The first user 101 may then specify send/receive settings that govern the exchange of DIs 10 (S420).

For receiving DIs, the first user 101 may enable or disable "passive" receiving, similar to the send settings described above (see FIG. 4). When passive receiving is disabled (S430), the program 30 does not automatically (or passively) collect or store any DIs 10 (S440). As such, the first user 101 may still "actively" collect DIs 10, for example, by manually inputting information into the program 30. However, the first device 25 does not automatically or passively collect any DIs 10 when passive receiving is disabled (S430).

When passive receiving is enabled (S435), the program 30 passively receives DIs 10 (e.g., without the need for the first user 101 to request the DIs or otherwise engage with the program 30) (S445). Passive receiving may be further specified according to one or more categories. For example, when passive receiving is enabled, the first user 101 may select an "all" mode (S446), a "smart" mode (S447), or a "custom" mode (S448). When the "all" mode is selected (S446), the first device 25 may receive any DI 10 that is encountered during the period of time, regardless of whether the parameters 32 are met (S456). It will be appreciated that some parameters 32 may still be required to effectuate sharing, such as the distance parameter 32B or the network parameter 32D.

When the "smart" mode is selected (S447), the first device 25 may receive any DIs 10 that meet the parameter(s) 32 (S457). For example, referring to the exemplary embodiment described above, the proximity parameter 32B may be set at 20 feet, the duration parameter 32E may be set at 90 seconds, and the speed parameter 32F may be set at 4 mph or less. As such, when any DI 10 meets each of these parameters 32, the DI 10 may be transmitted to the first device 25.

When the "custom" mode is selected (S448), the first device 25 may receive any DIs 10 that meet one or more filters created by the first user 101 (S458). For example, in some embodiments, the "smart" mode is designed to facilitate transfer of DIs 10 when the user 100 has engaged (or actively engaged) with another user 100. The "custom" mode, however, may be utilized to meet any particular needs of the user 100 and may be governed by customizable parameters. For example, if the first user 101 is travelling through a new neighborhood and doesn't stop and enter or inspect any businesses, but would like to gather information about the businesses on a particular street, the first user 101 may enable passive sharing via the "custom" mode (S448) with various parameters set such that any DI 10 that is within 15 feet of the first device 25 for a duration of five or more seconds, regardless of speed, is transferred to the first device 25. Further, the first user 101 may set category specific filters, such as restaurants only, coffee only, shops only, or may restrict certain categories, such as no fast food restaurants.

When the "passive" mode is enabled, the DIs 10 are collected during the period of time and retained in the memory of the first device 25 (e.g., in the memory 28, in a temporary cache, etc.) for future review (e.g., at the termination of the period of time) (S460). The first user 101 may then delete any DIs 10 which the first user 101 does not want or need to store in long term memory (S456) and may save any DIs 10 which the first user 101 wants or needs to store in long term memory (S457).

Figure 9:
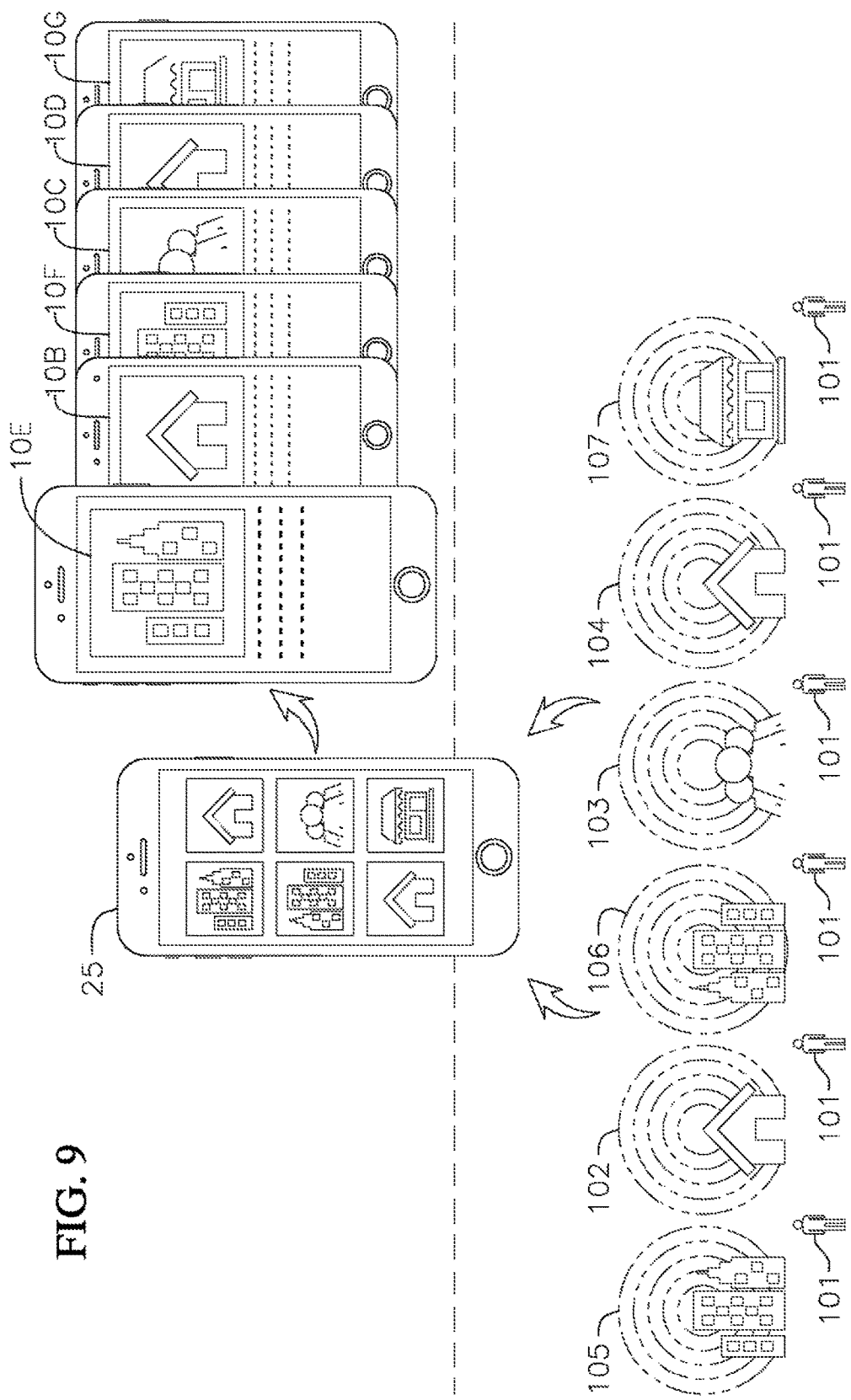
FIG. 9 is a schematic view of a method of receiving multiple digital identities according to one or more embodiments of the present disclosure.

Referring to FIG. 9, over the period of time (e.g., during one day), the first user 101 may acquire six DIs: the second DI 10B, the third DI 10C, the fourth DI 10D, the fifth DI 10E, the sixth DI 10F, and the seventh DI 10G. The first user 101 may acquire the second, third, fourth, fifth, sixth, and seventh DIs 10B, 10C, 10D, 10E, 10F, and 10G and leave the DIs in the temporary cache throughout the course of the day. At the end of the day, the first user 101 may review the second, third, fourth, fifth, sixth, and seventh DIs 10B, 10C, 10D, 10E, 10F, and 10G, add notes to the respective notes sections 22, and/or discard the DIs or move the DIs to permanent storage.

As such, the first user 101 may review the various DIs 10 acquired throughout the period of time to facilitate recollection of the events of the day. For example, at the end of the day, the first user 101 may review the second, third, fourth, fifth, sixth, and seventh DIs 10B, 10C, 10D, 10E, 10F, and 10G on the second device 27 and recall experiences from the day. Accordingly, when the first user 101 encounters many other users during the period of time, the first user 101 may use the program 30 to quickly and easily recall the events of the period of time by reviewing the DIs 10 that were acquired (e.g., passively acquired).

Similarly, the user 100 may acquire multiple DIs 10 regardless of a temporal element. For example, the first user 101 may attend a professional conference. The first user 101 may thus acquire multiple DIs 10 when the parameter(s) 32 are met. The DIs 10 may be stored for later review, such that at a later time, for example, at the end of the conference, the first user 101 may review the collected DIs 10 and make notes, categorize the DIs 10, etc.

In some embodiments, the user 100 may actively collect the DI 10 by utilizing an augmented reality feature of the program 30 by utilizing the camera of the device 26. In more detail, referring to FIGS. 15A-15D, the first user 101 may be located adjacent a business or establishment, for example, the fifth user 105. The first user 101 may then access the program 30 on the first device 25, and the program 30 may access the camera of the first device 25. The first user 101 may then orient the first device 25 such that the camera of the first device 25 points toward the fifth user 105, for example, by referencing the displayed image on the first device 25 in communication with the camera. When the program detects any information relating to the fifth user 105 based on the information captured by the camera (for example, the name of the fifth user 105, the location of the fifth user 105, the appearance of the fifth user 105, etc.), the fifth DI 10E may then be transmitted to the first device 25. The program 30 may then store or temporarily store the fifth DI 10E and the first user 101 may sort the fifth DI 10E, as discussed further below.

In addition, when collecting DIs 10, the user 100 may designate different modes for collection, relating to a footprint for collection. For example, the user 100 may designate an immediate mode for capturing DIs 10 that are immediately adjacent (e.g., within 20 feet of the device 26), a local mode for capturing DIs 10 that are located within a local radius (e.g., within 250 feet of the device 26), or a wide mode for capturing DIs 10 that are located within a wider radius (e.g., within 1 mile of the device 26). The user may then review and sort each DI 10 that is collected according to the footprint designation separately, or may collectively review and sort the DIs 10 that are collected in the footprint designation.

According to one or more embodiments of the present disclosure, when the user 100 collects the DI 10, the user 100 may subsequently review and catalog (or sort) the DI 10. In some embodiments, the program 30 may be configured for sorting the DI 10 into one or more group. For example, program 30 may be configured for sorting the DI 10 into a first group, a second group, and/or a third group. As another example, program 30 may be configured for sorting the DI 10 in an "inner" group (or inner circle) 36, an "outer" group (or outer circle) 38, and/or a "private" group (or private circle) 40 according to a level of interest in the DI 10. Although reference is made herein to three groups for categorizing the DIs 10, the present disclosure is not limited thereto, and in some embodiments, the DIs 10 may be categorized in four or more groups, or two or fewer groups. The terms "inner", "outer", and "private" are used herein for convenience of explanation, but embodiments of the present disclosure are not limited thereto or thereby.

Figure 10:
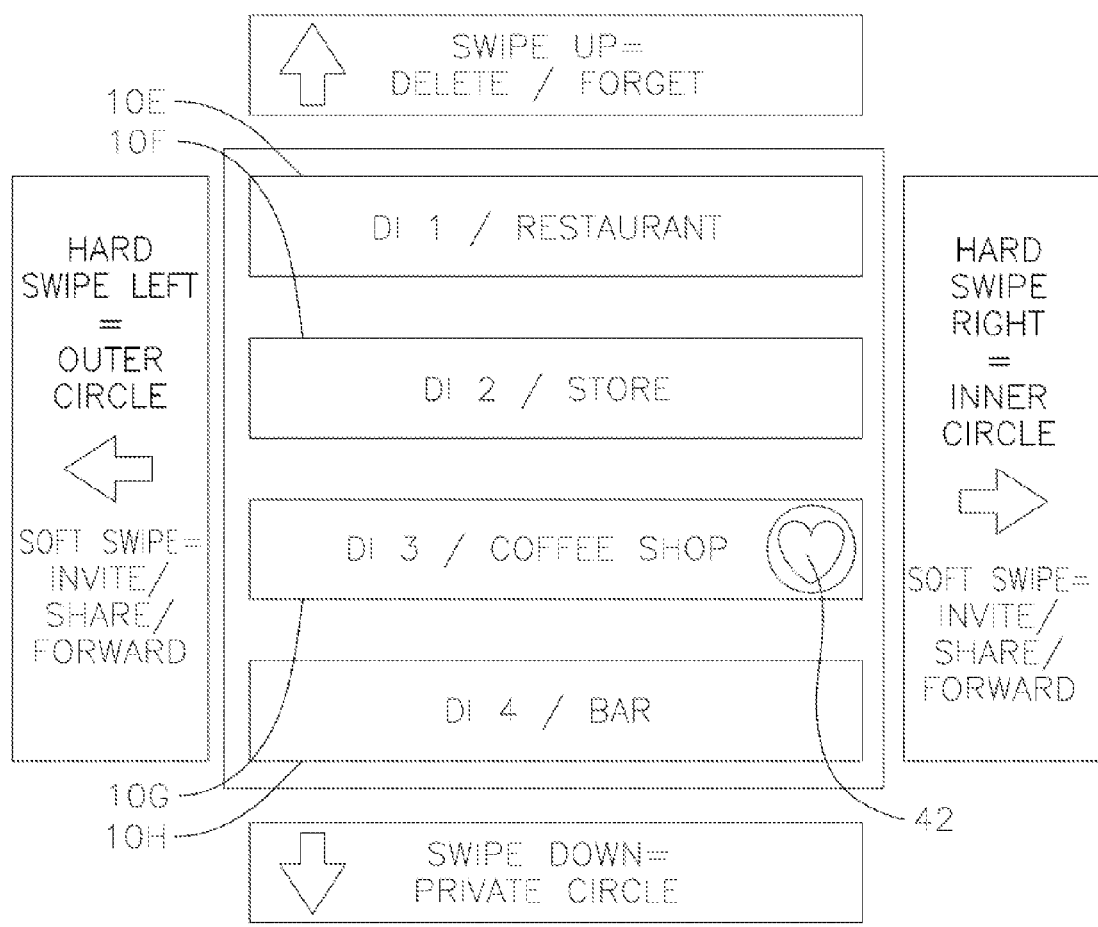
FIG. 10 is a schematic view of a method of reviewing and sorting received digital identities according to one or more embodiments of the present disclosure.

The inner group 36 may be used to categorize DIs 10 that are preferred users or users that correspond to the "personal persona" of the user 100, the private group 40 may be used to categorize DIs 10 that correspond to the "private persona" of the user 100 (such as medical contacts, etc.), and the outer group 38 may be used to categorize DIs 10 that are not preferred or that correspond to the "professional persona" or the "public persona" of the user 100. In some embodiments, the DIs 10 may be tagged or labeled as a "favorite" or preferred DI. For example, as illustrated in FIG. 10, there may be a favorite symbol 42, such as a heart or other signifier, that may be applied to the DIs 10. The symbol 42 may be added to a DI 10 by double tapping (or double clicking) any portion of the DI 10.

Figure 11:
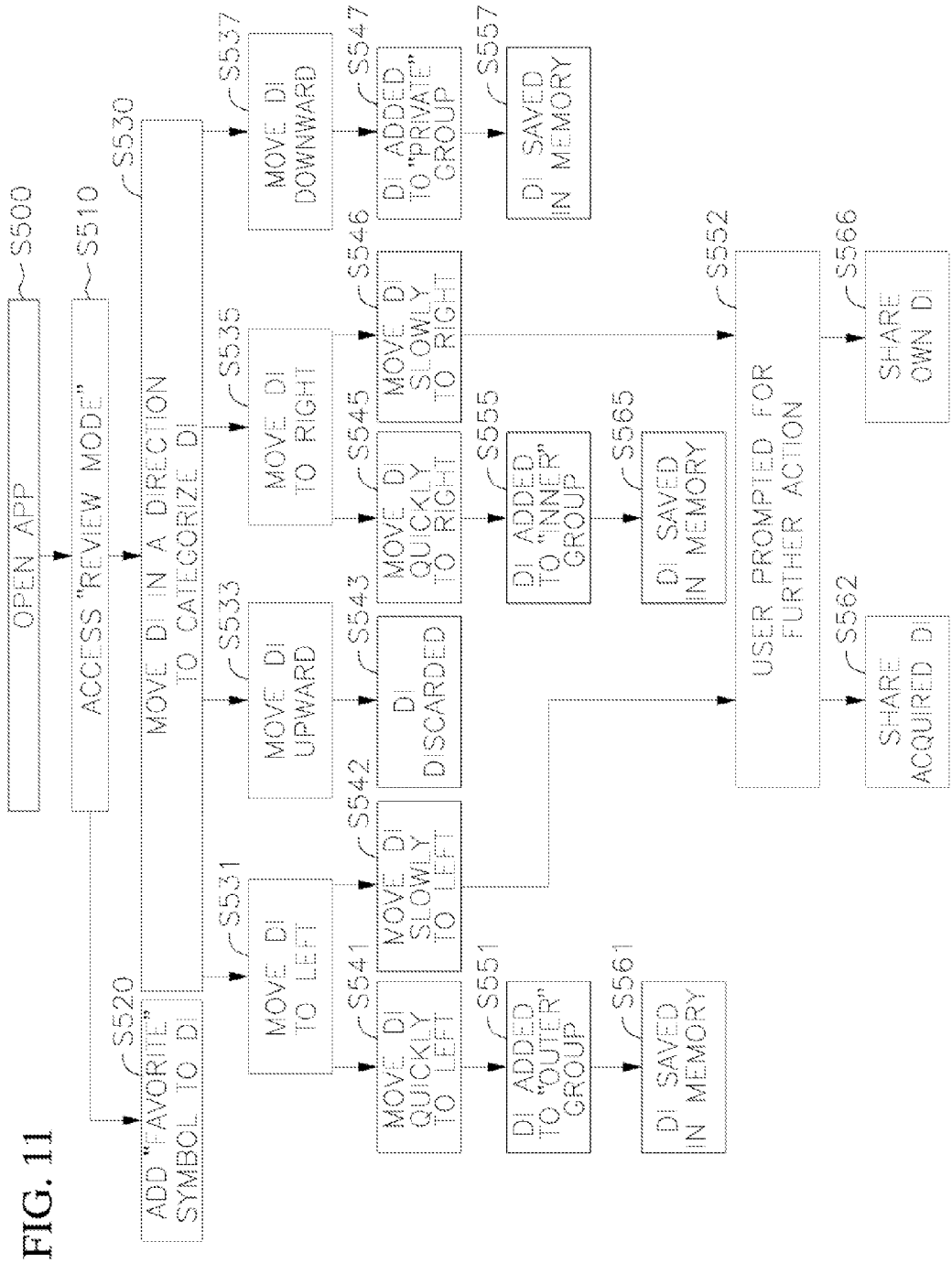
FIG. 11 is a flow chart illustrating a method of reviewing and sorting received digital identities according to one or more embodiments of the present disclosure.

Referring to an example embodiment illustrated in FIGS. 10 and 11, the first user 101 may use the program 30 to review and catalog (or categorize) the DIs 10 collected during the period of time, for example, during the day. For example, the first user 101 may collect the fifth DI 10E, the sixth DI 10F, the seventh DI 10G, and the eighth DI 10H during the day. At the end of the day, the first user 101 may open the program 30 (S500) and access a "review mode" of the program 30 (S510). The first user 101 may categorize the DIs 10 by contacting the DI 10 on the screen 28 of the first device 25 (e.g., by contacting with a finger or by clicking with a mouse) and swiping (or clicking and dragging) the DI 10 along a direction (S530). As an example, the first user 101 may move the DI 10 to the left (S531), upwardly (S533), to the right (S535), or downwardly (S537). When the first user 101 moves the DI 10 to the left, the first user 101 may move hard (or quickly) to the left (S541) or softly (or slowly) to the left (S542), and similarly when the first user 101 moves the DI 10 the right, the first user 101 may move hard (or quickly) to the right (S545) or softly (or slowly) to the right (S546).

Quickly moving the DI 10 to the left (S541) adds the DI 10 to the "outer" group 38, moving the DI 10 in an upward direction (S533) deletes the DI 10 from the first device 25 (S543), quickly moving the DI 10 to the right (S545) adds the DI 10 to the "inner" group 36, and moving the DI 10 in a downward direction (S537) adds the DI 10 to the "private" group 40. Slowly moving the DI 10 to the left (S542) or to the right (S546) facilitates additional engagement with the DI 10 (S552), as discussed further below. By moving the DI 10 in a direction, the first user 101 may quickly review the DIs 10 collected during the day and categorize the DIs 10 (or remove the DIs 10 from the first device 25) for easier review at a later time. When the first user 101 wants to further categorize the DI 10 (e.g., as a favorite), the user may apply the symbol 42 to the DI 10 (S520).

In more detail, when the first user 101 quickly moves the fifth DI 10E to the left (S541), the fifth DI 10E is then added to the "outer" group (S551) and saved to the memory 29 (S561). When the first user 101 moves the sixth DI 1OF upwardly (S533), the sixth DI 1OF is discarded, i.e., is not saved to the memory 29 and is removed from any temporary cache or storage of the first device 25 (S543). When the first user quickly moves the seventh DI 10G to the right (S545), the seventh DI 10G is added to the "inner" group (S555) and saved to the memory 29 (S565). When the first user 101 moves the eighth DI 10H downwardly (S537), the eighth DI 10H is added to the "private" group 40 (S547) and saved to the memory 29 (S557).

The first user 101 may slowly move the fifth DI 10E to the left (S542) and may slowly move the seventh DI 10G to the right (S546). The program 30 then prompts the first user 101 for additional action. For example, referring to the fifth DI 10E, the program 30 may be configured to facilitate sharing of the fifth DI 10E with another user (e.g., the second user 102) (S562) and/or sharing the DI 10A (i.e., the first user's DI) with the fifth user 105 (S566).

In some embodiments, the program 30 may utilize various sensors on the device 26. For example, the program 30 may interact with a gyroscope, an accelerometer, the GPS system, the camera, a microphone, and/or voice recognition software to facilitate exchanging, storing, updating, and/or interacting with the DIs 10.

A user may review, save, and sort the DI 10 in a variety of ways. As an example, the user may draw an "!", "√", or "X" on the user interface displaying the DI 10 to indicate approval or disapproval of the goods or services provided by the subject of the DI 10. The "!" may be used to sort the DI 10 to the "inner" group, the "√" may be used to sort the DI 10 the "outer" group, and the "X" may be used to discard the DI 10. A question mark "?" may be drawn to indicate uncertainty about the subject of the DI 10, which may leave the DI 10 in a temporary cache for later review. Alternatively, in the case where a user has visited a business or establishment that is the subject of the DI 10, the user may grasp his or her smart device and draw a virtual "!" or "√" or "X" or "?" within or proximate the establishment to indicate whether the corresponding DI 10 should be saved to the user's device. Using the smart device's accelerometer, location tracking and other features in parallel, the user may quickly and seamlessly indicate whether the DI 10 of the business or establishment should be saved to the user's device.

Figure 16:
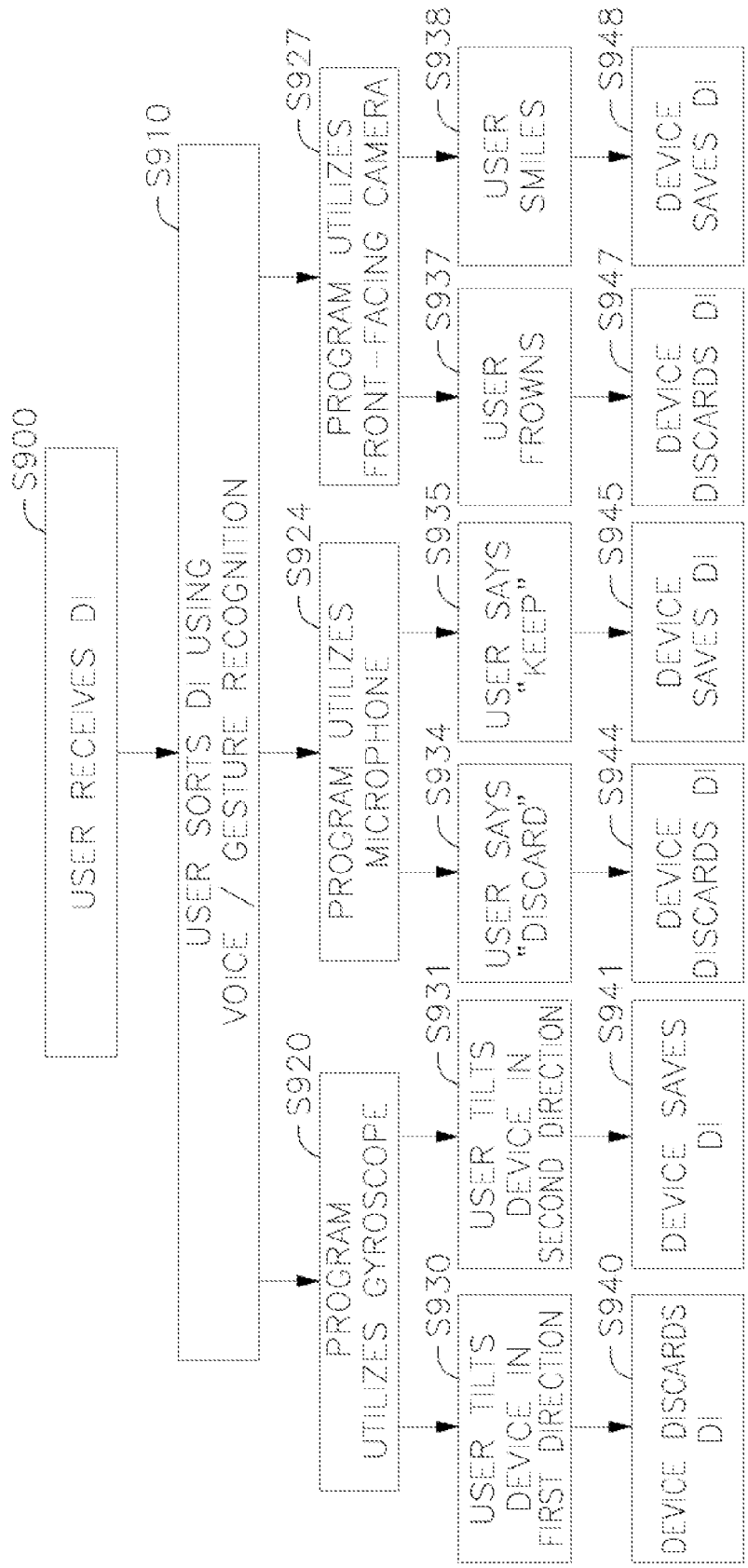
FIG. 16 is a flow chart illustrating a method of reviewing and sorting received digital identities according to one or more embodiments of the present disclosure.

As another example, referring to FIG. 16, after the user 100 receives the DI 10 (S900), the program 30 may utilize gesture and/or voice recognition to sort the DI 10 according to a manner in which the user 100 moves the device 26 (S910). In some embodiments, the program 30 may utilize the gyroscope of the device 26 (S920), such that when the user tilts the device 26, the DI 10 is saved or discarded. For example, when the user 100 tilts the device 26 in a first direction (e.g., draws an "X" shape, tilts upwardly) (S930), the DI 10 is discarded (S940). Similarly, when the user tilts the device 26 in a second direction (e.g, draws a "√" shape, tilts to the right or left) (S931), the DI 10 is saved to the device 26 (S941). Further, it will be appreciated that the gyroscope, location tracking, and other features may be used in parallel, or the gyroscope may be used at a later point in time after the DI has been temporarily collected. Similarly, the program 30 may utilize the microphone and/or voice recognition software (S924), so that the user 100 may state their preferences such as "keep" or "discard" or "inner group" or "outer group" to quickly and seamlessly store or discard the DI 10. In more detail, in some embodiments when the user 100 states "discard" (S934), the DI 10 is discarded (S944), and when the user 100 states "keep" (S935), the device 26 saves the DI 10 (S945).

As yet another example, the program may utilize a front-facing camera on the device 26 (S927) and sort the DIs 10 according to an expression made by the user 100. For example, when the user 100 makes an exaggerated frown expression (S937), the DI 10 may be discarded (S947), and when the user makes an exaggerated smile expression (S938), the DI 10 is saved to the device 26 (S948).

The DIs 10 stored in the memory 29 of the device 26 may be catalogued according to the "inner" group 36, the "outer" group 38, the "private" group 40, and/or the symbol 42. In addition, the DIs 10 may be catalogued according to one or more characteristics of each DI 10. For example, the DIs 10 may be sorted alphabetically (according to a first name, a last name, etc. of the respective user with whom the DI 10 is associated), location (e.g., the location where the DI 10 was acquired and/or an address listed in the information section 20), date acquired, etc.

In some embodiments, the user 100 (e.g., the first user 101 or the fifth user 105) may create a tag corresponding to the DI 10 (e.g., the fifth DI 10E), which is shared with the program 30 for suggested sharing with other users. For example, the fifth user 105 may add a tag to the fifth DI 10E relating to a business of the fifth user 105, such as "furniture." The fifth DI 10E may then be shared through the program 30, and when any user searches for "furniture," the fifth DI 10E may return as a search result. Similarly, the first user 101 may add the tag to the fifth DI 10E when the first user 101 stores the fifth DI 10E on the first device 25. Accordingly, when other users search for a keyword related to (or the same as) the tag (e.g., when other users search for the term "furniture"), the fifth DI 10E may return as a search result because the first user 101 added the tag to the fifth DI 10E.

Figure 12:
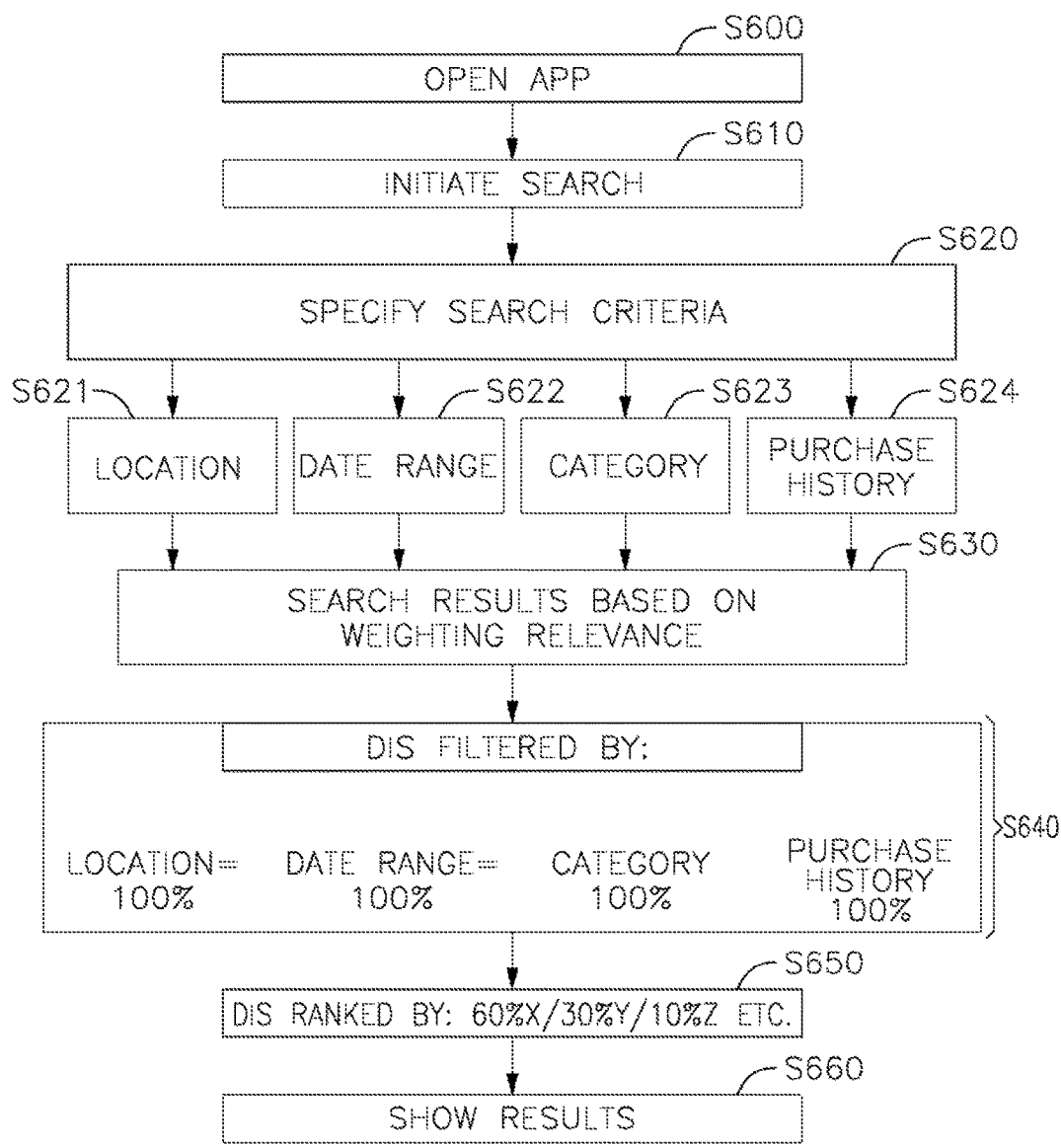
FIG. 12 is a flow chart illustrating a method of searching for a digital identity according to one or more embodiments of the present disclosure.

Referring to FIG. 12, when the first user 101 desires to recall one of the DIs 10, the first user 101 may access the program 30 (S600) and initiate a search (S610). When each DI 10 is stored on the first device 25, the DI 10 may be assigned values according to one or more parameters. For example, in some embodiments, each DI 10 may be assigned a first value corresponding to the date the DI 10 was acquired, a second value corresponding to a name of the user associated with the DI 10, a third value corresponding to whether a transaction (e.g., a purchase) was made with the user associated with the DI 10, a fourth value corresponding to a category (e.g., goods or services offered by the user, any tag associated with the DI 10, etc.), and/or a fifth value corresponding to a location associated with the DI 10. The DIs 10 are then sorted and saved according to their assigned values.

The DIs 10 may be searchable by one or more search criteria (S620), for example, based on name (e.g., the name of the respective user listed in the information section 20 of the DI 10), text added to the notes section 22, location (e.g., a location where the DI 10 was acquired and/or an address listed in the information section 20) (S621), date acquired (S622), category (S623), tag, whether a purchase was made (S624), etc. In other words, any content on the DI 10 and/or any terms associated with the DI 10 may be stored and made searchable so that the first user 101 may quickly recall any DI 10 stored on the first device 25. The search criteria may be specified as a specific location, date, etc. (e.g., Mar. 1, 2016), ora range (e.g., Mar. 1, 2016-Apr. 30, 2016).

When the first user 101 inputs the search criteria, the program 30 scans the plurality of DIs 10 to determine whether any of the DIs 10 have a value that corresponds to the search criteria (S630). When multiple search values are input, (e.g., when the user searches for a location and a date of acquisition), the program 30 ranks and weights all relevant DIs 10. For example, when the user specifies three criteria for the search, each filter may be accorded a 33.33% weight ranking. As another example, the program 30 may weight each filter according to the order the filter is added. For example, if the location is input first, then the date range, and then the category, the program 30 may assign 60% weight to DIs matching the specified location, 30% weight to DIs matching the date range, and 10% weight to DIs matching the specified category. The DIs 10 are then filtered according to the search criteria (S640), weighted and ranked (S650), and the results of the search are output to the user (S660). In some embodiments, once the relevant DIs 10 are determined, the ranking of the output search results may include other factors that are unrelated to the search. For example, the results may be ranked according to proximity to the first device 25 at the time of initiating the search (e.g., according to real-time GPS coordinates of the first device 25).

In some embodiments, the first user 101 may add filters to the search in stages. For example, the first user 101 may access the program 30 (S600) and initiate a search (S610) based on a specific location (S621). The program 30 may then search all DIs 10 stored in the first device 25 (S630) and, because only one filter is applied, present all DIs 10 on the first device 25 relating to the location (S650). The first user 101 may then further narrow the search by adding a second filter, for example, by specifying a category (S623). The program 30 may then present all DIs 10 relating to the location and relating to the category (S650). The first user 101 may continue to refine the search as necessary. In some embodiments, each time a filter is applied in sequence, the program 30 may apply the filter at 100%, removing from the results any DIs 10 that do not meet each filter.

The first user 101 may also utilize the program 30 to find users having similar or related DIs relative to the DIs 10 that are stored on the device 26. For example, the program 30 may catalog and categorize each DI 10 that the first user 101 collects using the program 30. The program 30 may then search other DIs 10 (e.g., in the global database) and transfer similar DIs 10 to the first device 25. As an example, the fifth user 105 may be a small business that specializes in wooden furniture and is located at a first location and the sixth user 106 may also be a business that specializes in wooden furniture and is located at a second location. The first user 101 may store the fifth DI 10E that is associated with the first location on the first device 25. When the first user 101 searches for businesses in or near the second location, the program 30 may search the stored DIs 10 on the first device 25, detect the fifth DI 10E, and may recommend the sixth DI 10F corresponding to the sixth user 106 in the second location and having similar characteristics as the fifth user 105.

According to one or more embodiments of the present disclosure, the program 30 may facilitate third party sharing. For example, the first user 101 may share the first DI 10A with the second user 102, who may then share the first DI 10A with the third user 103. As such, the second user 102 may use the program 30 to provide information about people or places that the second user 102 has previously interacted with. In some embodiments, the first DI 10A is shared with the third user 103 by the second user 102 with the notes section 22 populated according to any information provided by the second user 102. In other embodiments, the first DI 10A is transferred to the third user 103 in the same form that it was provided to the second user 102 (e.g., without any comments).

Figure 13:
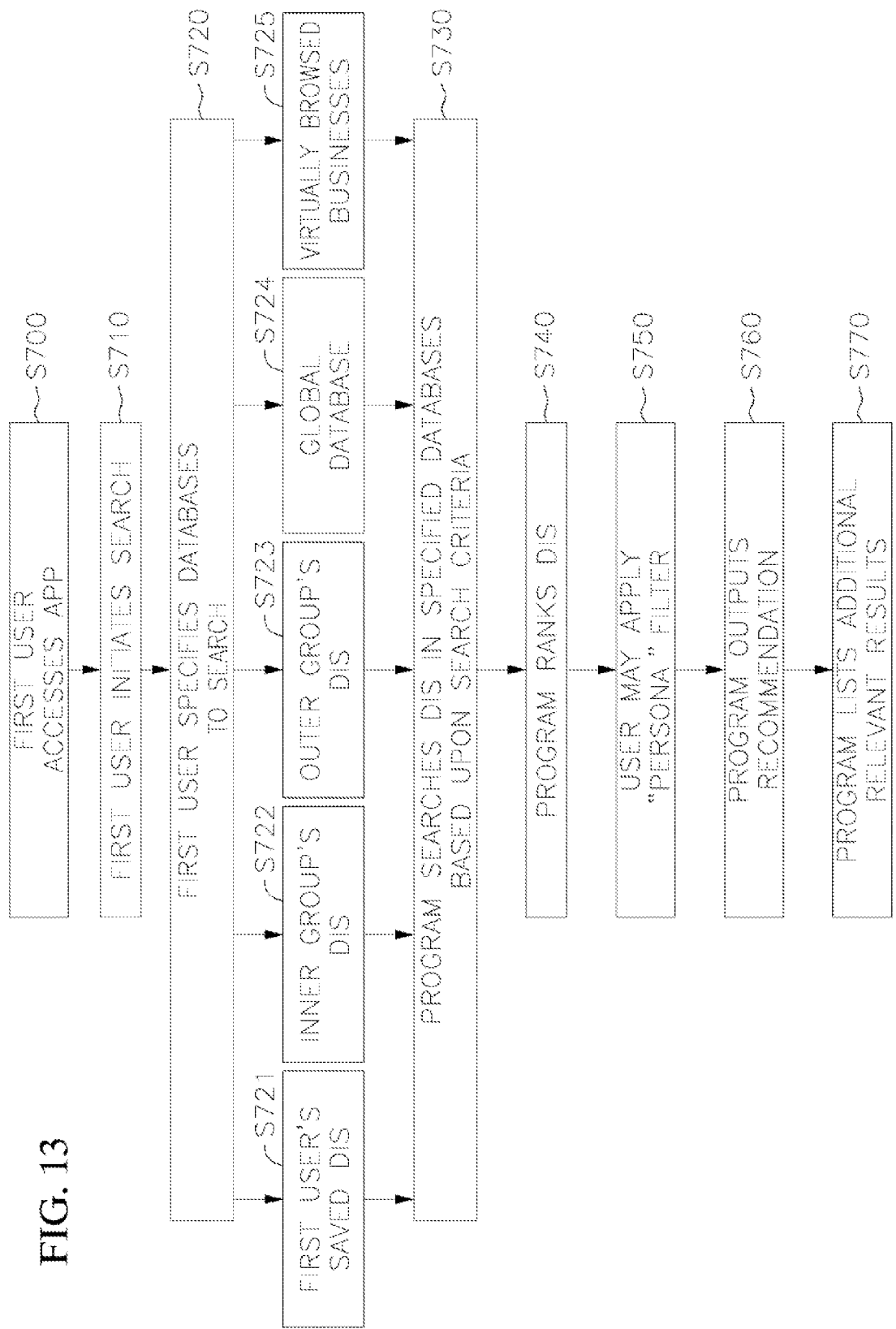
FIG. 13 is a flow chart illustrating a method of searching for a digital identity according to one or more embodiments of the present disclosure.

According to one or more embodiments of the present disclosure, the first user 101 may initiate a search, and the program 30 may output a recommendation. For example, referring to FIG. 13, the first user 101 may access the program 30 (S700) and initiate a search (S710). To initiate a search, the first user 101 may input search criteria (e.g., pizza) and may specify one or more databases to search (S720). For example, the first user 101 may limit the search to: DIs 10 that are stored on the first device 25 (S721), DIs 10 that are stored on devices 26 of other users 100 in the first user's "inner" group (S722), DIs 10 that are stored on devices 26 of other users 100 in the first user's "outer" group (S723),the global database of DIs 10 that have been created by all users 100 of the program 30 (S724) and/or DIs relating to websites, social media profiles, etc. that the first user 101 has virtually visited (S725). The program 30 then searches the DIs 10 according to the user's search criteria and database restrictions (S730) and ranks the DIs (S740). In some embodiments, the first user 101 may then apply a "persona filter" to further tailor the output from the program 30 (S750). For example, the first user 101 may apply a "Dad" filter so that the recommendation is tailored to kid-friendly results, a "Trending" filter so that the recommendation is tailored to trending results, a "Business" filter so that the recommendation is tailored to results suitable for sharing with business contacts, etc. The program 30 may rank the relevant DIs 10 according to proximity to the first user 101 (and/or proximity to the first device 25), frequency of visits by users in the selected database(s), availability (e.g., whether the corresponding user indicates a wait time for a table, etc.), the "persona filter," etc. Based on a weight-ranking of these factors, the program 30 then outputs a recommendation to the first user 101 (S760). The program 30 may also output a list of alternative recommendations based on relevant DIs 10 found in the search (S770). As such, the first user 101 may receive tailored search results according to the initiated search.

In one or more embodiments, the program 30 may be coupled with (and account for) virtual browsing habits of the user 100. For example, the program 30 may track browsing habits of the user 100 in the virtual marketplace, social media websites, etc. The program 30 may then utilize similar parameters related to the user's browsing habits, in addition to or instead of the DIs 10 the user has collected, in providing recommendations, weighting search results, etc. As such, even without acquiring a DI 10, when the user 100 has researched a business, or when a business is trending or connected to the user 100 through social media, the program 30 may use the browsing information in providing various outputs.

Figure 14:
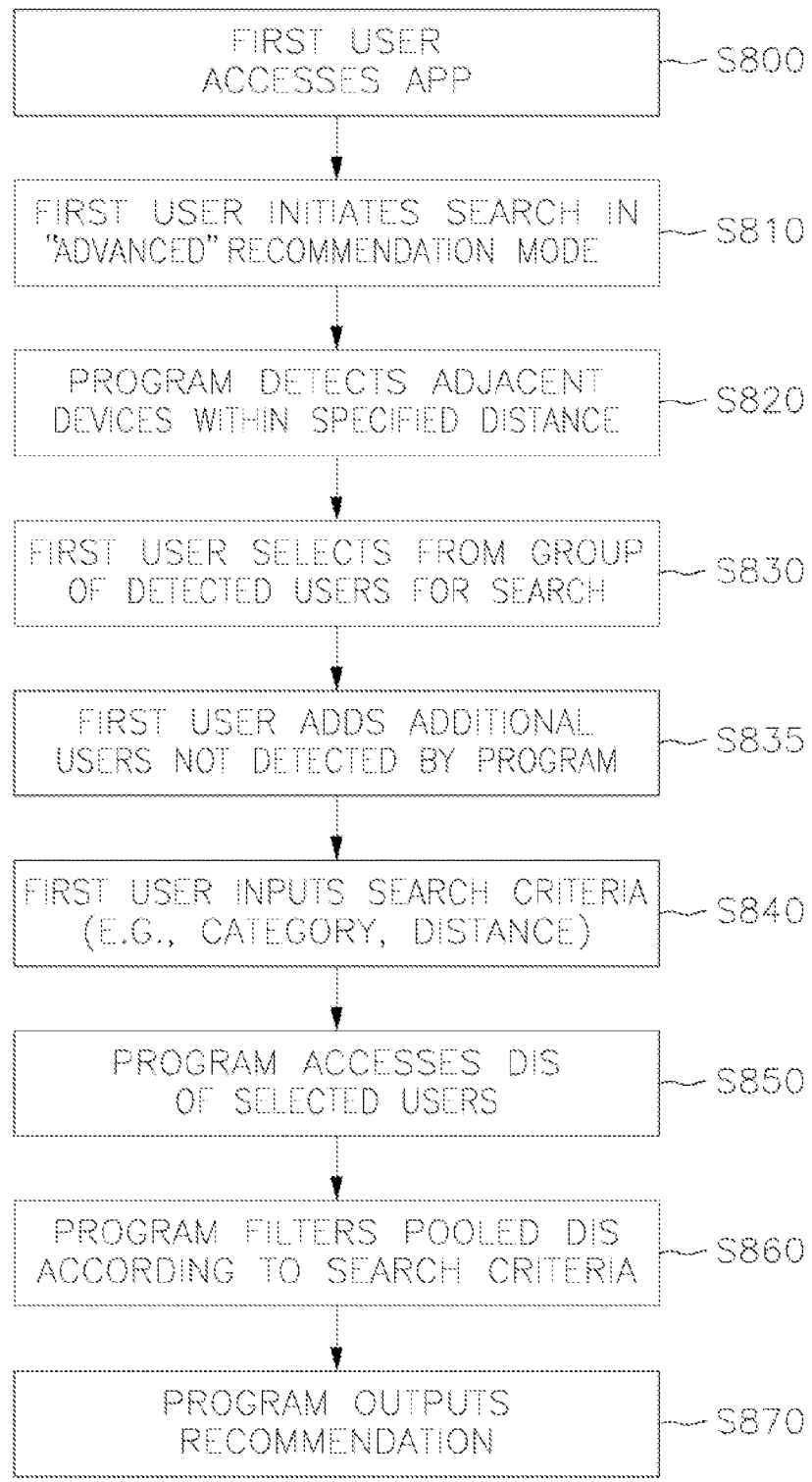
FIG. 14 is a flow chart illustrating a method of searching for a recommended digital identity according to one or more embodiments of the present disclosure.

According to one or more embodiments of the present disclosure, the program 30 may search DIs 10 of adjacent users and recommend relevant DIs 10 to the group. Referring to FIG. 14, the first user 101 may access the program 30 (S800) and initiate a search using an "advanced recommendation" mode (S810). In the "advanced recommendation" mode, the program 30 may detect other devices 26 that are within a specified distance of the first device 25 (S820), and presents the detected users to the first user 101. The first user 101 may then select from the group of detected users to initiate a search through those user's DIs 10 (S830). The first user 101 may also add any additional users who were not detected by the program 30 so that the program 30 also searches the DIs 10 of the additional users (S835). The first user 101 then inputs search criteria, such as a category, distance, availability, favorites, etc. (S840). The program 30 then accesses and pools any DIs 10 associated with the specified users (S850) and the program 30 searches and filters the pooled DIs 10 according to the search criteria (S860). As discussed above, the program 30 applies various weight ranking to the relevant DIs 10 and outputs a recommended DI 10 that best meets the search criteria (S870). The program 30 may also apply additional filters to the search, such as a trending filter, a highly rated filter, a wait time filter, etc.

A user may contribute to the rating filter in a variety of ways. For example, the user may draw an "!" or "X" on the user interface displaying the DI to indicate approval or disapproval of the goods or services provided by the subject of the DI. A question mark may be drawn to indicate uncertainty about the subject of the DI, which may be used by others to fill in additional data. Alternatively, in the case where a user has visited a business or establishment that is the subject of the DI, the user may grasp his or her smart device and draw a virtual "!" or "X" or "?" within or proximate the establishment to indicate his or her rating of the establishment. Using the smart device's accelerometer, location tracking and other features in parallel, the user may quickly and seamlessly enter an evaluation of the business or establishment, including the goods and services provided.

It will be appreciated that embodiments of the present disclosure are not limited to particular orders of operations. For example, in the above example, the first user 101 may first access the program 30 (S800), initiate a search in "advanced recommendation" mode (S810), input a category for the search (S840), then specify the users for the search (S830), and then apply any additional filters for the search (S840).

In addition, in some embodiments, the user 100 may create a list that groups or categorizes various DIs 10. For example, the first user 101 may create a list of DIs 10 collected on vacation in Paris. The first user 101 may then quickly access all of the DIs 10 on the device 26 that were collected in Paris, and may quickly and easily share all of the DIs 10 on the device 26 that were collected in Paris with the second user 102, or with all users in a particular group (e.g., the "inner" group 36). As another example, the first user 101 may create a list relating to physicians, and may quickly and easily share all of the DIs 10 on the device 26 that relate to physicians with another user or group.

For each list, the first user 101 may add specified notes (for example, via a checkbox or predictive text) that are searchable by the program 30 and which may be used to further group or classify the DIs 10. For example, the first user 101 may obtain a DI according to the fifth user 105, which may be a restaurant. The first user 101 may then indicate whether the fifth user 105 provides outdoor seating, what meal was enjoyed, whether young children are easily accommodated, etc., by checking a checkbox or otherwise noting the applicable category. This information may then be utilized in searches, and to provide weight rankings for the first user 101 and connections of the first user 101.

In some embodiments, the first user 101 may create and provide a list according to particular interests or amenities. For example, if the second user 102 travels from Los Angeles to New York City and the first user 101 previously collected one or more DIs 10 in New York City, the program 30 may facilitate sharing of the DIs 10 collected by the first user 101. In some embodiments, the DIs 10 may be automatically shared with the second user 102 when she meets a particular parameter 32 (for example, when she arrives in New York City as detected by location services), or the first user 101 may elect to share the DIs 10 with the second user 102. As such, the second user 102 may gather information from the first user 101 about travel experiences, likes and dislikes, etc. of the first user 101 via the program 30 and the DIs 10. As an example, the first user 101 may designate all DIs 10 collected by the first user 101 having a "New York" tag (e.g., a geographic tag) and a "lunch" tag with the second user 102, and all DIs 10 collected by the first user 101 having the "New York" tag and the "lunch" tag would then be transmitted to the second device 27. As explained, such tags may be gathered and generated autonomously by the user's device based on location, temporal and other information sensed and gathered by the device based upon the user's actions.

According to one or more embodiments of the present disclosure, the DI 10 may be dynamically altered once another user receives the DI 10. For example, the first user 101 may save the second DI 10B on the device 26. When the first user 101 receives the second DI 10B, the second DI 10B may list a first location, for example, Los Angeles. If the second user 102 subsequently moves to a second location and updates the second DI 10B via the program 30, when the first user 101 subsequently recalls the second DI 10B on the device 26, the second DI 10B will include the second location instead of the first location. Accordingly, the DI 10 remains dynamic and is capable of being modified even after the DI 10 has been shared with another user. In some embodiments, the first user 101 may receive a notification or a push notification indicating that information on the second DI 10B has been changed.

While this disclosure has been described in detail with particular references to some exemplary embodiments thereof, the exemplary embodiments described herein are not intended to be exhaustive or to limit the scope of the disclosure to the exact forms disclosed. It is understood that the drawings are not necessarily to scale. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and their equivalents.

What is claimed is:

1. A system for receiving and searching digital identities, the system comprising:

a mobile device comprising:
  a processor;
  a display coupled to the processor;
  a user interface device for sending a signal to the processor according to a user input from a first user; and
  a memory storing instructions that, when executed by the processor, cause the processor to:
    store a plurality of digital identities in the memory, wherein each of the digital identities comprises a name of a corresponding user, an address of the corresponding user, a contact email and/or phone number of the corresponding user, and additional characteristics pertaining to the user, displayed in a single screen of the mobile device, and wherein each of the digital identities is updated in real-time;
    assign a first value to each of the digital identities, the first value comprising a date on which the respective digital identity was stored in the memory;
    assign a second value to each of the digital identities, the second value comprising the address of the corresponding user;
    assign a third value to each of the digital identities, the third value comprising a category tag;
    sort the plurality of digital identities according to a search function upon receipt of a search command, the search command comprising a search term and an ordered combination of indexing values, each of the indexing values comprising one of a date, a location, and a category;
    filter the plurality of digital identities according to an output value of the search function $0.6X+0.3Y+0.1Z$ and the search term, wherein X is a first indexing value from the ordered combination of indexing values, wherein Y is a second indexing value from the ordered combination of indexing values, and wherein Z is a third indexing value from the ordered combination of indexing values;
    order the plurality of digital identities from highest output value to lowest output value according to the filtered plurality of digital identities; and
    display the ordered plurality of digital identities on the single screen of the mobile device,
  wherein the digital identities of third parties not associated with the first user are automatically installed on the mobile device based upon one or more of speed, location, distance, duration, network connection, and/or search history.

2. The system of claim 1, wherein the first indexing value comprises the date, wherein the second indexing value comprises the location, and wherein the third indexing value comprises the category.

3. The system of claim 1, wherein one or more of the indexing values is defined as a range of values.

4. The system of claim 1, wherein the search term comprises global positioning system coordinates of the mobile device that are automatically transmitted to the memory such that the mobile device sorts and filters the plurality of digital identities according to a real-time location of the mobile device.

5. The system of claim 1, wherein the memory further stores instructions that, when executed by the processor, cause the processor to:
  send a signal to an adjacent mobile device having one or more second device digital identities stored thereon;
  cache the one or more second device digital identities in the memory;
  sort the one or more second device digital identities according to the search function and the search command;
  filter the one or more second device digital identities with the plurality of digital identities from highest output value to lowest output value to generate a combined filtered list of digital identities; and
  display the combined filtered list of digital identities on the single screen of the mobile device.

6. The system of claim 1, wherein the search command is input via the user interface device.

7. The system of claim 1, wherein the search command is input via a touch screen having touch screen sensitivity, a gyroscope and movement of the mobile device, and/or a microphone and voice recognition software.

8. The system of claim 1, wherein the phone numbers of the digital identities are configured to actuate the mobile device such that when the digital identity is displayed on the single screen of the mobile device, the first user may initiate a phone call between the mobile device and a phone associated the phone number of the digital identity.

9. The system of claim 1, wherein the digital identities of the third parties are temporarily stored on the mobile device.

10. A method of receiving and searching digital identities, the method comprising:
  storing a plurality of digital identities in a memory of a mobile device, the mobile device comprising:
    a processor;
    a display coupled to the processor;
    a user interface device for sending a signal to the processor according to a user input from a first user; and
    a memory storing instructions, wherein each of the digital identities comprises a name of a corresponding user, an address of the corresponding user, a contact email and/or phone number of the corresponding user, and additional characteristics pertaining to the user, displayed in a single screen of the mobile device, and wherein each of the digital identities is updated in real-time;
  assigning a first value to each of the digital identities, the first value comprising a date on which the respective digital identity was stored in the memory;
  assigning a second value to each of the digital identities, the second value comprising the address of the corresponding user;
  assigning a third value to each of the digital identities, the third value comprising a category tag;
  sorting the plurality of digital identities according to a search function upon receipt of a search command, the search command comprising a search term and an ordered combination of indexing values, each of the indexing values comprising one of a date, a location, and a category;
  filtering the plurality of digital identities according to an output value of the search function $0.6X+0.3Y+0.1Z$ and the search term, wherein X is a first indexing value from the ordered combination of indexing values, wherein Y is a second indexing value from the ordered combination of indexing values, and wherein Z is a third indexing value from the ordered combination of indexing values;
  ordering the plurality of digital identities from highest output value to lowest output value according to the filtered plurality of digital identities; and displaying the ordered plurality of digital identities on the single screen of the mobile device, wherein the digital identities of third parties not associated with the first user are automatically installed on the mobile device based upon one or more of speed, location, distance, duration, network connection, and/or search history.

11. The method of claim 10, wherein one or more of the indexing values is defined as a range of values.

12. The method of claim 10, wherein the search term comprises global positioning system coordinates of the mobile device that are automatically transmitted to the memory such that the mobile device sorts and filters the plurality of digital identities according to a real-time location of the mobile device.

13. The method of claim 10, further comprising:

sending a signal to an adjacent mobile device having one or more second device digital identities stored thereon;

caching the one or more second device digital identities in the memory;

sorting the one or more second device digital identities according to the search function and the search command;

filtering the one or more second device digital identities with the plurality of digital identities from highest output value to lowest output value to generate a combined filtered list of digital identities; and displaying the combined filtered list of digital identities on the single screen of the mobile device.

14. The method of claim 10, wherein the phone numbers of the digital identities are configured to actuate the mobile device such that when the digital identity is displayed on the single screen of the mobile device, the first user may initiate a phone call between the mobile device and a phone associated the phone number of the digital identity.

15. The method of claim 10, wherein the digital identities of the third parties are temporarily stored on the mobile device.

* * * * *